(12) United States Patent
Van de Mark et al.

(10) Patent No.: US 7,705,084 B2
(45) Date of Patent: Apr. 27, 2010

(54) WATER BORNE FILM-FORMING COMPOSITIONS

(75) Inventors: Michael R. Van de Mark, Rolla, MO (US); Nantana Jiratumnukul, Bangkok (TH)

(73) Assignee: The Curators of the University of Missouri, Columbia, MI (US)

( * ) Notice: Subject to any disclaimer, the term of this patent is extended or adjusted under 35 U.S.C. 154(b) by 610 days.

(21) Appl. No.: 11/608,138

(22) Filed: Dec. 7, 2006

(65) Prior Publication Data

US 2007/0093579 A1    Apr. 26, 2007

Related U.S. Application Data

(63) Continuation of application No. 10/643,612, filed on Aug. 19, 2003, now abandoned, which is a continuation of application No. 09/532,839, filed on Mar. 21, 2000, now Pat. No. 7,160,945.

(60) Provisional application No. 60/125,446, filed on Mar. 22, 1999.

(51) Int. Cl.
    *C08K 3/20*     (2006.01)
(52) U.S. Cl. ..................................... 524/501
(58) Field of Classification Search ................... 524/501
See application file for complete search history.

(56) References Cited

U.S. PATENT DOCUMENTS

| | | | |
|---|---|---|---|
| 2,795,564 A | 6/1957 | Conn et al. | |
| 3,884,856 A | 5/1975 | Motier et al. | |
| 3,918,984 A | 11/1975 | High et al. | |
| 4,090,886 A | 5/1978 | Turner | |
| 4,131,580 A | 12/1978 | Emmons et al. | |
| 4,141,868 A | 2/1979 | Emmons et al. | |
| 4,147,674 A | 4/1979 | Vasta | |
| 4,206,099 A | 6/1980 | Bentley et al. | |
| 4,233,362 A | 11/1980 | Novak et al. | |
| 4,303,581 A | 12/1981 | Levine et al. | |
| 4,489,188 A | 12/1984 | Jones et al. | |
| 4,966,939 A | 10/1990 | Craig | |
| 5,206,077 A | 4/1993 | Cowley et al. | |
| 5,236,987 A | 8/1993 | Arendt | |
| 5,286,554 A | 2/1994 | Cowley et al. | |
| 5,349,026 A | 9/1994 | Emmons et al. | |
| 5,484,849 A | 1/1996 | Bors et al. | |
| 5,753,742 A | 5/1998 | Bumanlag | |
| 5,869,590 A | 2/1999 | Clark et al. | |
| 6,156,833 A | 12/2000 | Rauls | |
| 6,177,510 B1 | 1/2001 | Saam | |
| 6,726,798 B2 | 4/2004 | Boege et al. | |
| 2003/0188828 A1 | 10/2003 | Boege et al. | |

FOREIGN PATENT DOCUMENTS

| | | |
|---|---|---|
| DE | 19531849 | 8/1995 |
| EP | 0026982 A1 | 4/1981 |
| EP | 0076558 A1 | 4/1983 |
| EP | 0611809 A2 | 8/1994 |
| WO | 9707173 | 2/1997 |

*Primary Examiner*—Edward J Cain
(74) *Attorney, Agent, or Firm*—Senniger Powers LLP

(57) ABSTRACT

The present invention provides a film-forming composition comprising a particulate polymer or emulsified liquid prepolymer, water and a coalescent aid comprising an ester having the formula RCOOX wherein R and X are independently hydrocarbyl or substituted hydrocarbyl, and at least one of R and X contain at least two unsaturated carbon-carbon bonds. The coalescent aid helps lower the minimum film formation temperature of low glass transition temperature coatings and high glass transition temperature coatings and allows optimum film formation at ambient temperatures. The coalescent aid of this coating composition is not volatile like conventional coalescent aids but rather remains part of the film and air oxidizes to cure the film. This coating composition also exhibits properties of adhesion and gloss superior to that of coating compositions containing conventional coalescent aids. Additionally, this coalescent aid can be made from natural or synthetic oils.

19 Claims, 32 Drawing Sheets

WATER BORNE FILM-FORMING COMPOSITIONS

CROSS-REFERENCE TO RELATED APPLICATIONS

This application is a continuation of application Ser. No. 10/643,612, filed Aug. 19, 2003, which is a continuation of application Ser. No. 09/532,839, filed Mar. 21, 2000, which claims priority from application Ser. No. 60/125,446, filed Mar. 22, 1999, the contents of which are hereby incorporated by reference in their entirety.

FIELD OF THE INVENTION

This invention generally relates to water borne film-forming compositions containing a polyunsaturated ester as a coalescent aid.

BACKGROUND OF THE INVENTION

Aqueous dispersions of particulate polymer or emulsified liquid pre-polymers for use as paints, sealants, caulks, adhesives or other coatings are well-known, widely-used articles of commerce. The effectiveness of the dispersion in forming a film after the polymer dispersion has been deposited upon a surface depends upon the glass transition temperature of the dispersed polymer and the temperature at which the film is allowed to dry. See, for example, Conn et al., U.S. Pat. No. 2,795,564 and Emmons et al., U.S. Pat. No. 4,131,580.

Coalescent aids have been used in such aqueous dispersions to soften, i.e., plasticize, the particulate polymers and facilitate the formation of a continuous film with optimum film properties once the water has evaporated. In addition to increasing the ease of film formation, the coalescent aid also promotes subsequent improvements in film properties by coalescing the particulate polymers and liquid pre-polymers and forming an integral film at ambient temperatures. Without the coalescent aid, the films may crack and fail to adhere to the substrate surface when dry.

Coalescent aids are particularly helpful in assisting the formation of particulate polymer films possessing a high glass transition temperature, that is, the temperature which defines how easily the particles of the polymer diffuse at the temperature at which the film-forming composition is applied. The presence of coalescent aids in a particulate polymer film having a high glass transition temperature allows optimum film formation at ambient temperatures.

Various alcohol esters and ether alcohols have been proposed for use as coalescent aids. For example, in U.S. Pat. No. 4,131,580 Emmons et al. disclose water-based coating compositions based on vinyl addition polymers of monoethylenically unsaturated monomers which comprise dicyclopentenyl acrylate and/or dicyclopentenyl methacrylate as a coalescent aid. In U.S. Pat. No. 4,141,868, Emmons et al. suggest certain ester-ether compounds be used instead. Two of the more widely used coalescent aids are ethylene glycol monobutyl ether (EB, Union Carbide) and 2,2,4-trimethyl-1,3 pentanediol monobutyrate (TEXANOL®, Eastman Kodak). While EB and TEXANOL® are useful in facilitating film formation of particulate polymer coatings with high glass transition temperatures and are even useful in facilitating film formation of particulate polymer coatings with low glass transition temperatures if they are being applied at a temperature that is lower than ambient temperature, they are relatively volatile and, as a result, are currently classified as VOCs (volatile organic compounds).

SUMMARY OF THE INVENTION

Among the objects of the invention is a coalescent aid for use in a water-borne film forming composition wherein the coalescent aid is not classified as a volatile organic compound, but which, nevertheless, (i) exhibits favorable adhesion and gloss relative to water borne film-forming compositions containing conventional coalescent aids, (ii) exhibits favorable minimum film formation temperature of low glass transition temperature films and high glass transition temperature films and (iii) allows optimum film formation at ambient temperatures.

Briefly, therefore, the present invention provides a film-forming composition comprising a continuous aqueous phase and a dispersed phase. The dispersed phase comprises (i) a particulate polymer or emulsified liquid prepolymer, and (ii) a coalescent aid comprising an ester having the formula RCOOX wherein R and X are independently hydrocarbyl or substituted hydrocarbyl and at least one of R and X comprises at least two unsaturated carbon-carbon bonds. Other objects of the invention will be in part apparent and in part pointed out hereinafter.

BRIEF DESCRIPTION OF THE DRAWINGS

In FIGS. 1-4 and 6-9, X1, X2, X3, X4, EB, EB_X and EB+X have the following meanings:

X1=Ethylene glycol soy oil ester,
X2=Propylene glycol soy oil ester,
X3=Diethylene glycol soy oil ester,
X4=Dipropylene glycol soy oil ester,
EB=Ethylene glycol monobutyl ether,
EB_X=derivatives and EB mixture 50:50, and
EB+X=derivatives and EB mixture 50:50.

Figure 5:
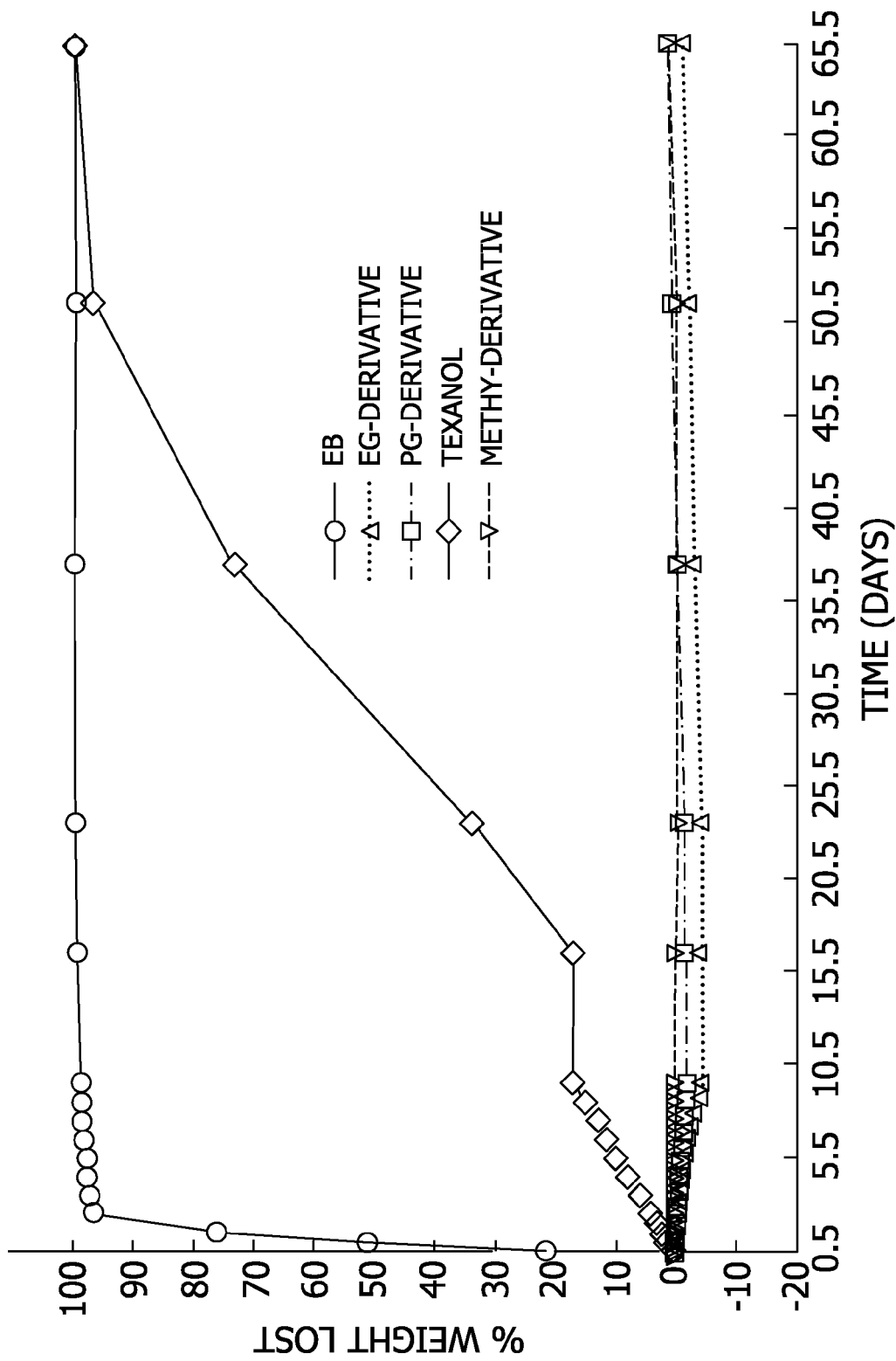
Figure 10:
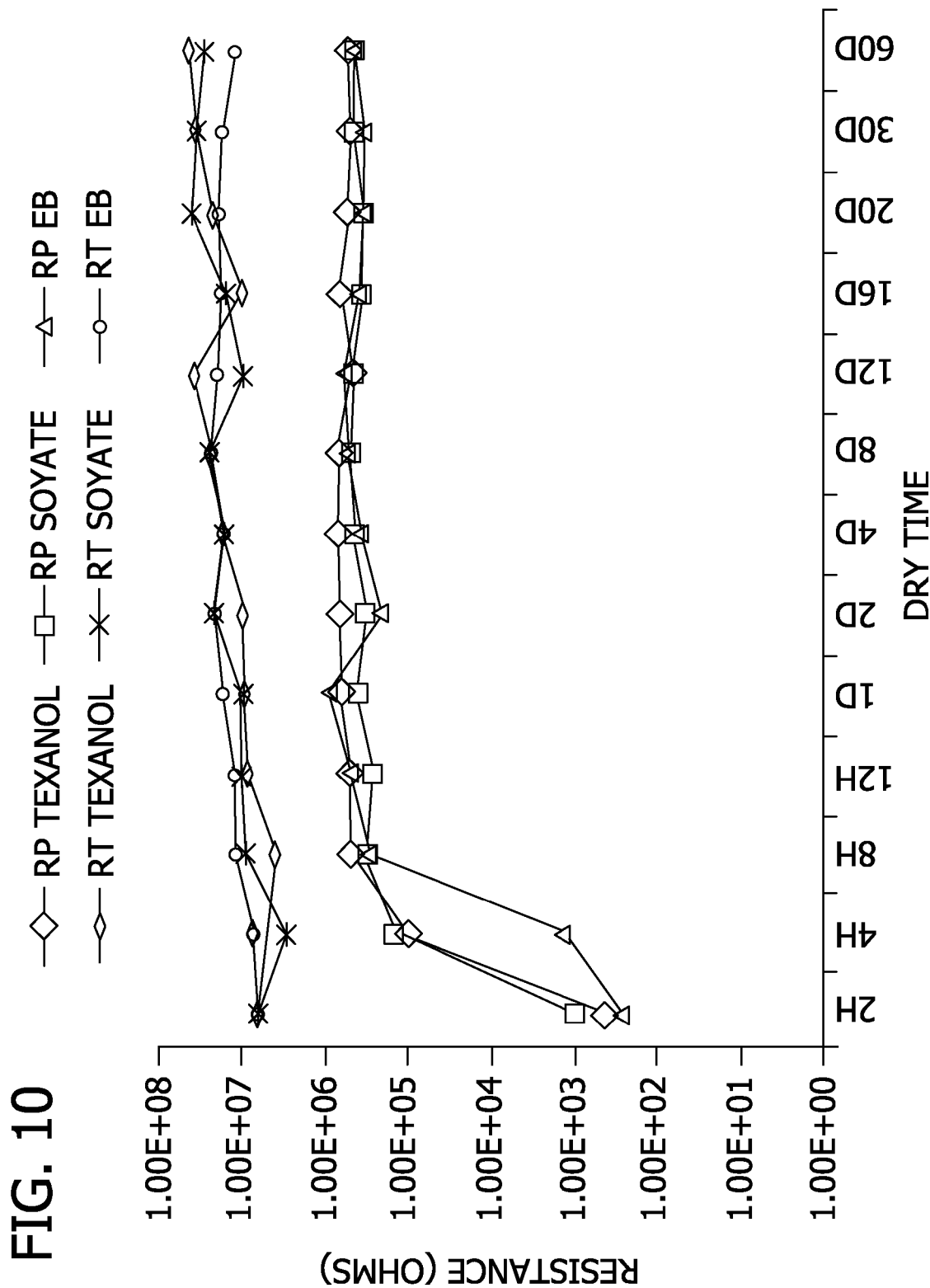
Figure 11:
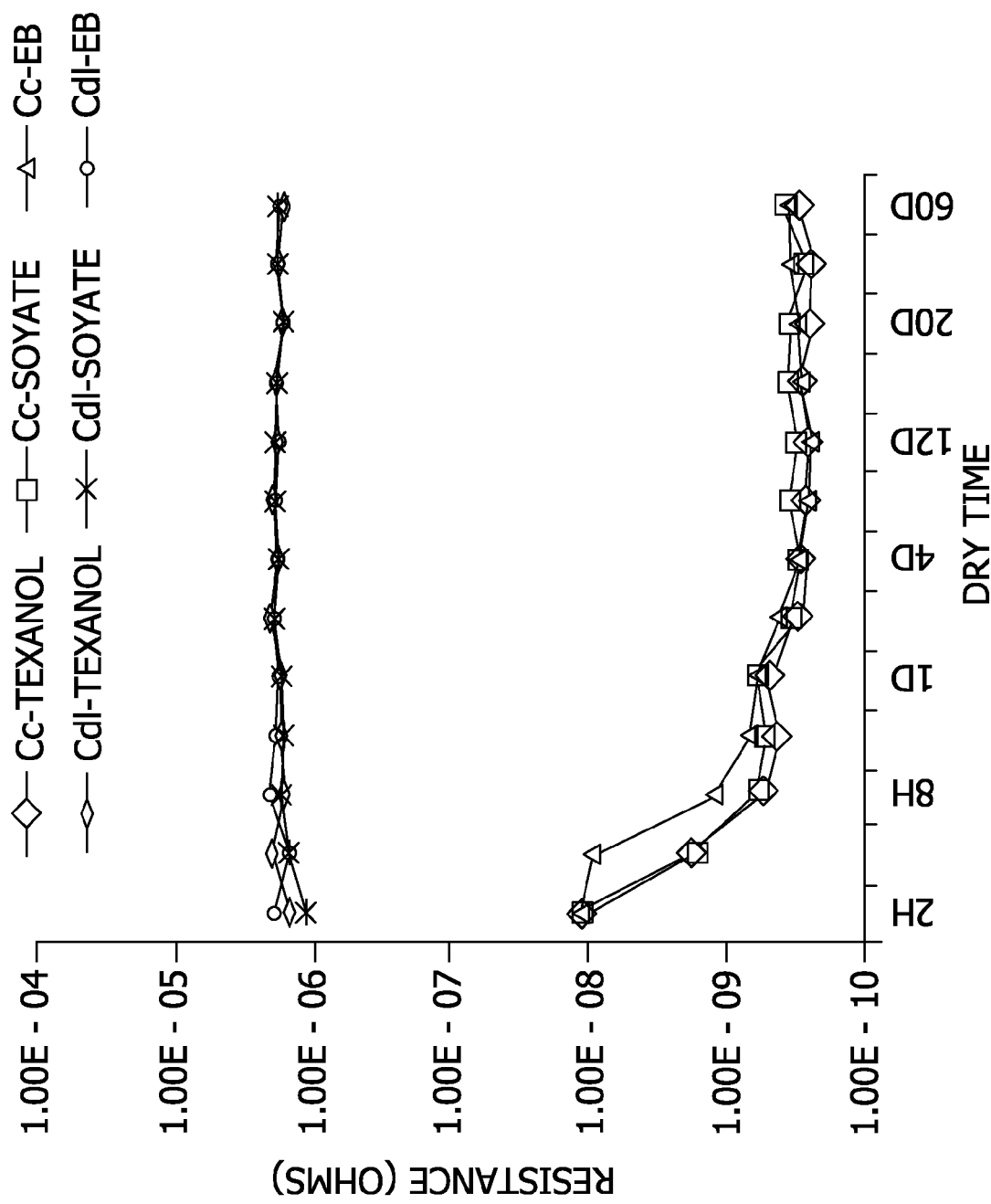

FIGS. 1-4 and 6-9 are plots of minimum film formation temperature as a function of % coalescent aid;

FIG. 5 is a plot of the evaporation rate of coalescent aid as a function of time;

FIG. 10 is a plot of coating resistance and charge transfer resistance as a function of dry time;

FIG. 11 is a plot of coating capacitance and associated double layer capacitance as a function of dry time;

FIGS. 12-19 are infrared spectra of soybean oil and various coalescent aids;

FIGS. 20-27 are $^{1}$H-NMR spectra of soybean oil and various coalescent aids; and FIGS. 28-32 are $^{13}$C-NMR spectra of soybean oil and various coalescent aids.

DETAILED DESCRIPTION OF THE PREFERRED EMBODIMENTS

The water-borne film-forming compositions of the present invention generally contain a continuous aqueous phase and a dispersed film-forming phase. In general, they may be formulated to function as a paint, sealant, caulk, adhesive or other coating. Thus, these film-forming compositions may have a wide range of viscosities, e.g., from about 50 to about 10,000 centipoise; paints, sealants and similar coatings typically have a viscosity from about 50 to about 10,000 centipoise, caulks typically have a viscosity from about 5,000 to about 50,000 centipoise, and adhesives typically have a viscosity from about 50 to about 50,000 centipoise. In addition, adhesives are formulated for cohesive strength as well as good contact with the substrate upon which the film-forming composition is deposited.

The continuous aqueous phase generally comprises at least about 10 wt % water with the amount of water depending upon the application. For example, paints, sealants and similar coating compositions will generally have at least about 10 wt % water and typically will contain about 20 wt % to about 80 wt % water with differing amounts being used for textured, high gloss, semi-gloss, flat, etc. coatings. Caulks will generally have at least about 10 wt % water and typically will contain about 10 wt % to about 25 wt % water with differing amounts being used for different caulk applications. Adhesives will generally range from about 10 wt % to about 80 wt % water and typically will contain about 40 wt % to about 60 wt % water with differing amounts being used for different adhesive applications.

The continuous aqueous phase may optionally include one or more water-soluble organic solvents, i.e., substituted hydrocarbon solvents. For example, modest amounts of ethylene glycol (e.g., 3-5 wt. %) or another glycol may be included for freeze-thaw protection. In general, however, the proportion of water-soluble organic solvents is preferably minimized; that is, the continuous aqueous phase preferably contains less than about 20 wt. % organic solvent, more preferably less than about 10 wt. % organic solvent, and still more preferably less than about 5 wt. % organic solvent, based upon the weight of the continuous aqueous phase and exclusive of any amount which may be present in a micelle or other dispersed phase or material.

The dispersed phase comprises a (i) particulate polymer or an emulsified liquid pre-polymer, (ii) a coalescent aid and, optionally, (iii) one or more additives. In general, the dispersed phase constitutes no more than about 90 wt % with the amount of dispersed phase depending upon the application. For example, paints, sealants and similar coating compositions will generally have no more than about 90 wt % dispersed phase and typically will contain about 20 wt % to about 80 wt % dispersed phase with differing amounts being used for textured, high gloss, semi-gloss, flat, etc. coatings. Caulks will generally have no more than about 90 wt % dispersed phase and typically will contain about 75 wt % to about 90 wt % dispersed phase with differing amounts being used for different caulk applications. Adhesives will generally range from about 20 wt % to about 90 wt % dispersed phase and typically will contain about 40 wt % to about 60 wt % dispersed phase with differing amounts being used for different adhesive applications.

In general, the particulate polymer or emulsified liquid pre-polymer is insoluble in the aqueous phase and is otherwise suitable for use in water borne film-forming compositions. Because the particulate polymer or emulsified liquid pre-polymer is the component which coalesces to form the desired film, the film-forming composition preferably comprises at least about 10 wt. %, more preferably at least about 15 wt. %, and depending for some applications at least about 20 wt. % of a coalescible particulate polymer or emulsified liquid pre-polymer.

Preferred particulate polymers are generally high molecular weight (e.g, greater than about 60,000 for latex), crosslinkable, polymer particles. For example, they may be either of the addition type, in particular a polymer or copolymer of one or more α,β-ethylenically unsaturated monomers, or of the condensation type, for example, a polyester or a polyamide. Suitable particulate polymers of the addition type include the polymerization and copolymerization products of styrene, vinyl acetate, vinyl toluene, vinyl chloride, vinylidene chloride, butadiene, vinyl hydrocarbons, acrylonitrile, acrylates, and methacrylate containing monomers. Suitable condensation type particulate polymers include epoxy, urethane, hydrocarbon, silicone, nitrocellulose, polyester, and alkyd polymers. Preferred particulate polymers include acrylate, methacrylate, styrene and vinyl acetate. Examples of preferred particulate polymers include the polymerizates or copolymerizates of one or more of the following: alkyl acrylates such as ethyl acrylate, butyl acrylate, 2-ethylhexyl acrylate, as well as other alkyl acrylates, alkyl methacrylates, styrene and vinyl acetate.

In general, smaller particulate polymers are more readily coalesced than larger particulate polymers. Accordingly, preferred particulate polymers generally have a size of about 3 micrometers or less. For example, for latex resins, approximately 90 wt. % of the latex particles will have a size less than about 0.2 micrometers.

Preferred emulsified liquid pre-polymers include alkyds, epoxies, nitrocellulose, and urethanes.

The coalescent aid of the present invention preferably comprises an ester having the formula

RCOOX wherein

R is hydrocarbyl or substituted hydrocarbyl,

X is hydrocarbyl or substituted hydrocarbyl, and at least one of R and X contains two or more aliphatic unsaturated carbon-carbon bonds (hereinafter "polyunsaturated").

Preferably, R contains about 1 to about 30 carbon atoms, more preferably about 9 to about 25 carbon atoms, and still more preferably about 15 to about 23 carbon atoms, X contains about 1 to about 30 carbon atoms, more preferably about 1 to about 18 carbon atoms, and still more preferably about 1 to about 6 atoms, and R and X in combination contain no more than about 35 carbon atoms, and more preferably, R and X, in combination, contain no more than about 30 carbon atoms. In addition, at least one of R and X preferably contains a conjugated double or triple carbon-carbon bond (i.e., two or more carbon-carbon double or triple bonds which alternate with carbon-carbon single bonds). For example, the unsaturation may take the form of two conjugated double bonds, a conjugated double bond and triple bond or two conjugated triple bonds.

While the carbon-carbon polyunsaturation may be provided in R or X, it is generally preferred that it be provided at the tail of the ester, i.e., in R. Thus, R is preferably hydrocarbyl or substituted hydrocarbyl possessing at least two aliphatic unsaturated carbon-carbon bonds, more preferably in conjugation, with R preferably comprising about 5 to about 25 carbon, more preferably about 9 to about 25 carbon atoms, and still more preferably about 11 to about 23 carbon atoms.

If R is substituted hydrocarbyl, it is preferably substituted with ketone, amide, ester, alcohol, urea, urethane, nitrile functionalities; silyl and amine functionalities are preferably avoided and alcohols are preferably avoided if the number of carbon atoms is less than about 10.

Optionally, the head of the ester, i.e., X, may be polyunsaturated instead of the tail of the ester. In this instance, X is preferably hydrocarbyl or substituted hydrocarbyl possessing at least two aliphatic unsaturated carbon-carbon bonds, more preferably in conjugation with X preferably comprising about 5 to about 30 carbon, more preferably about 5 to about 25 carbon atoms, and still more preferably about 5 to about 24 carbon atoms.

If R is polyunsaturated, X may optionally contain one or more degrees of carbon-carbon unsaturation. Stated another way, X may be hydrocarbyl or substituted hydrocarbyl optionally possessing one or more degrees of carbon-carbon unsaturation. As with R, X may optionally contain at least 2 degrees of carbon-carbon unsaturation with the 2 degrees of carbon-carbon unsaturation optionally being in conjugation. In one embodiment of the present invention, for example, X is X'—OH wherein X' is a hydrocarbyl or substituted hydrocarbyl radical comprising about 1 to about 8 carbon atoms. Preferably, X' comprises about 2 to about 6 carbon atoms and, in one embodiment X' possesses at least one degree of unsaturation. If X or X' is substituted hydrocarbyl, it is preferably mixture of esters with at least one of the esters being a polyunsaturate. In a third embodiment, the coalescent aid comprises a polyunsaturated ester with a conventional coalescent aid such as ethylene glycol monobutyl ether (EB, Union Carbide) or 2,2,4-trimethyl-1,3 pentanediol monobutyrate (TEXANOL®, Eastman Kodak). Where composition(s) other than polyunsaturated esters are also used as a coalescent aid, it is generally preferred that the polyunsaturated ester comprise at least about 5 wt. %, more preferably at least about 10 wt. %, still more preferably at least about 25 wt. %, still more preferably at least about 50 wt. %, and still more preferably at least about 75 wt. %, based upon the total combined weights of the compositions used as coalescent aids.

The polyunsaturated ester of the present invention may be derived from a natural, genetically engineered or synthetic material such as an oil, fat, lecithin or petroleum product. In a preferred embodiment, the coalescent aid comprises a polyunsaturated ester derived from an oil of plant or animal origin (including oils obtained from genetically engineered species), such as canola, linseed, soybean, or another naturally occurring oil such as one identified in Table I. Examples of preferred polyunsaturated esters include methyl ester, ethylene glycol monoester, diethylene glycol monoester, propylene glycol monoester, and dipropylene glycol monoester derived from the fatty acids of these oils.

TABLE I

| | AVERAGE FATTY ACID AS PERCENT OF TOTAL FATTY ACID Number of Carbon Atoms | | | | | | | | | | | | | |
|---|---|---|---|---|---|---|---|---|---|---|---|---|---|---|
| | * | 6 | 10 | 12 | 14 | 16 | 18 | 18 | 18 | 18 | 16 | 18 | 22 | 20-22 | 20-24 |
| | | | | | | | | Number of Double Bonds | | | | | | | |
| VEGETABLE OIL | | 0 | 0 | 0 | 0 | 0 | 0 | 1 | 2 | 3 | 1 | 1 | 1 | ** | 3 |
| Castor | 85 | | | | | 1.0 | 2.0 | 2.0 | 5.0 | | 90.0 | | | | |
| Corn | 124 | | | | | 13.0 | 4.0 | 29.0 | 54.0 | | | | | | |
| Cottonseed | 107 | | | | | 22.0 | 2.0 | 21.0 | 54.0 | | | | | | |
| Crambe | 94 | | | | | 3.0 | 2.0 | 18.0 | 10.0 | 5.0 | | | 56.0 | 3.0 | 2.0 |
| Linseed | 185 | | | | | 6.0 | 4.0 | 20.0 | 17.0 | 53.0 | | | | | |
| Mustard | 120 | | | | | 2.0 | | 24.0 | 20.0 | 6.0 | | | 43.0 | | 5.0 |
| Olive | 80 | | | | | 8.0 | 2.0 | 82.0 | 8.0 | | | | | | |
| Oiticica[1] | 150 | | | | | 7.0 | 6.0 | 5.0 | | | | | | | |
| Peanut | 90 | | | | | 7.0 | 6.0 | 60.0 | 22.0 | | | | | | 5.0 |
| Rapeseed | 101 | | | | | 2.0 | 2.0 | 16.0 | 16.0 | 8.0 | | | 45.0 | 6.0 | 4.0 |
| Rice Bran | 102 | | | | | 17.0 | 1.0 | 47.0 | 35.0 | | | | | | |
| Safflower | 141 | | | | | 6.0 | 2.0 | 13.0 | 79.0 | | | | | | |
| Sardine, Pilchard | 190 | | | | | 14.0 | 3.0 | 10.0 | 15.0 | | 12.0 | | | 41.0 | |
| Sesame | 110 | | | | | 9.0 | 4.0 | 46.0 | 41.0 | | | | | | |
| Soybean | 130 | | | | | 8.0 | 6.0 | 28.0 | 50.0 | 8.0 | | | | | |
| Sunflower | 139 | | | | | 6.0 | 2.0 | 26.0 | 66.0 | | | | | | |
| Tung (Regular)[2] | 165 | | | | | 4.0 | 1.0 | 5.0 | 8.0 | | | | | | |
| Tung (African)[3] | 160 | | | | | 4.0 | 1.0 | 9.0 | 15.0 | | | | | | |
| Walnut (English) | 150 | | | | | 9.0 | 1.0 | 16.0 | 60.0 | 13.0 | | | | | |

* Iodine Number;
** polyethenoic acids;
[1]contains 82% licanic acid;
[2]contains 82% eleostearic acid;
[3]contains 71% elestearic acid substituted with ketone, amide, ester, alcohol, urea, urethane, nitrile functionalities; silyl and amine functionalities are preferably avoided.

The polyunsaturated ester of the present invention is preferably sufficiently involatile to avoid categorization as a Volatile Organic Compound by the United States Environmental Protection Agency. In one embodiment of the present invention, the coalescent aid is a single ester. In another embodiment of the present invention, the coalescent aid comprises a The fatty acid ester glycols may be prepared by transesterification reactions between various glycols and fatty acids from soybean and other oils of plant or animal origin in the presence of a catalyst. Suitable catalysts include bases such as lithium hydroxide, tin oxides, tin catalysts, and calcium oxide with the reaction temperature generally being about 100 to about 200 EC. In a preferred embodiment, the glycol used in the reaction is ethylene glycol, propylene glycol, diethylene glycol or dipropylene glycol with the reaction being carried out with about 6 moles of glycol per mole of soybean oil in the presence of a basic catalyst at a temperature of about 190° C. under nitrogen atmosphere. After reaction, the excess glycol is extracted with water several times. The soy oil ester is extracted with ethyl ether and dried, for example, with magnesium sulfate. Then the ethyl ether is distilled off. The reaction equation is given below.

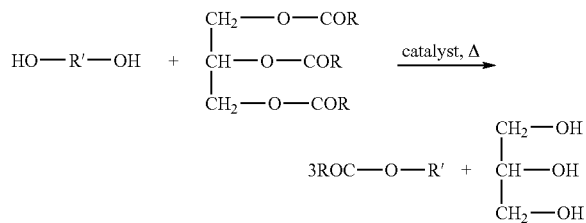

where R is unsaturated hydrocarbon chain having 17 carbons

R' is a group of the formula —$C_2H_4$— for ethylene glycol
—$C_3H_6$— for propylene glycol
—$C_2H_4O$—$C_2H_4$— for diethylene glycol
—$C_3H_6O$—$C_3H_6$— for dipropylene glycol The amount of coalescent aid needed to assist in film formation depends on the viscosity of the film-forming composition, the temperature at which the composition is being applied, the glass transition temperature of the film-former, and the minimum film formation temperature of the film-former. In general, the amount of coalescent will be proportional to the amount and type of resin used with ratios in the range of about 0.1 wt % to about 50 wt. % (based upon the weight of the dry resin), typically in the 1 wt. % to about 4 wt. % range (based upon the weight of the dry resin).

Any coalescent aid which remains in the film will act as a plasticizer, keeping the glass transition temperature low unless it has polyunsaturation which will allow it to be air oxidized and oligomerized which results in the coalescent aid becoming more of a resin and less of a plasticizer. Thus, the glass transition temperature is in part recovered. In general, the greater degree of unsaturation of the coalescent aid the more glass transition temperature recovery can be expected. Where a mixture of materials are used as the coalescent aid, therefore, it is generally preferred that the polyunsaturated acid(s) comprise at least about 5 wt. %, more preferably at least about 25 wt. %, still more preferably at least about 40 wt. % and still more preferably at least about 50 wt. % of the coalescent aid.

Trace amounts of the polyunsaturated ester coalescent aid of the present invention may be dissolved in the continuous aqueous phase; that is, preferably less than about 10 wt. %, more preferably less than 5 wt. %, still more preferably less than 1 wt. %, and for some embodiments still more preferably less than about 0.5 wt. % of the polyunsaturated ester is dissolved in the continuous aqueous phase, based upon the weight of the continuous aqueous phase. The predominant proportion of the polyunsaturated ester coalescent aid is thus preferably dissolved in the dispersed particulate polymer or liquid pre-polymer. Preferably at least 80 wt. %, more preferably at least 90 wt. %, more preferably at least 95 wt. %, and still more preferably at least 99 wt. % of the polyunsaturated ester coalescent aid is dissolved in the dispersed particulate polymer or liquid pre-polymer. Depending upon the type and amount of surfactants included in the film-forming composition, a relatively small fraction of the polyunsaturated ester coalescent aid may additionally be emulsified in the continuous aqueous phase and found in micelles along with surfactant.

The film-forming composition of the present invention may also contain various conventional additives which may be in the dispersed and/or continuous phases. Such additives include thickening agents such as carboxymethylcellulose sold by Aquilon under the trade designation NATRASOL 250 and thickeners sold under the trade designation M-P-A 1075 by Rheox, pH modifiers such as ammonium hydroxide and N,N-dimethyl ethanolamine, defoaming agents such as mineral oil or silicone oils, wetting agents such as a nonionic surfactant sold by AKZO under the trade designation INTER-WET 43 and a nonionic surfactant sold by Rohm & Haas under the trade designation Triton X100, algicides such as organotin compounds and tetrachloroisophthalonitrile, fungicides such as tributyl tin oxide, and 3-iodo-2-propynyl butyl carbamate, dispersants such as lecithin and an anionic dispersant sold under the trade designation BUSPERSE 39 by Buckman, ultraviolet inhibitors such as a benztriazol UV inhibitor sold under the trade designation TINUVIN 328 by Ciba-Geigy and a hindered amine UV inhibitor sold under the trade designation by TINUVIN 123 by Ciba-Geigy, flow and leveling agents such as a polyacrylate sold under the trade designation BYK 354 by BYK-Chemie and a polysiloxane copolymer sold under the trade designation BYK 310 by BYK-Chemie, flash rust inhibitors such as an inhibitor sold under the trade designation RAYBO 63 by Raybo or a barium metaborate rust inhibitor sold under the trade designation BUSAN 11M1 by Buckman, and freeze/thaw inhibitors such as ethylene glycol. Additional additives include driers such as cobalt driers carboxylate salts (0.0 to 0.15 wt. % Co based on the coalescent aid) and manganese driers carboxylate salts (0.0 to 0.15 wt. % based on the coalescent aid), accelerators such as 1,10-phenanthroline (0 to 0.2% based on the coalescent aid) and 2,2-bipyridine (0 to 0.2% based on the coalescent aid), and anti-skinning agents such as butanone oxime (0-11 lb/100 gal formulation). When present and depending upon the application for the film-forming composition, these additives will generally not constitute more than about 10 wt. % of the film-forming composition and will typically constitute about 3 wt. % to about 10 wt. % of the film-forming composition.

The film-forming composition is formed by conventional methods used to prepare paints, adhesives, except that the polyunsaturated ester of the present invention is substituted, at least in part, for a conventional coalescent aid. The resulting film-forming composition can easily be applied conventionally using a brush, roller, or like means and requires no unusual methods of drying to form the desired film. Thus, films formed from the composition of the present invention may be dried under ambient conditions. Furthermore, the film-forming composition may be applied to a variety of materials.

Definitions

As used herein, the term "hydrocarbyl" shall mean a radical consisting exclusively of carbon and hydrogen. The hydrocarbyl may be branched or unbranched, saturated or unsaturated. Suitable hydrocarbyl moieties include alkyl, alkenyl, alkynyl, and aryl moieties. They also include alkyl, alkenyl, alkynyl, and aryl moieties substituted with other saturated or unsaturated hydrocarbyl moieties such as alkaryl, alkenaryl and alkynaryl. Preferably, the hydrocarbyl does not include an aryl moiety and except as otherwise indicated herein, the hydrocarbyl moieties preferably comprises up to about 25 carbon atoms.

The aryl moieties described herein contain from 6 to 20 carbon atoms and include phenyl. They may be hydrocarbyl substituted with the various substituents defined herein. Phenyl is the more preferred aryl.

The term "substituted hydrocarbyl" shall mean a hydrocarbyl radical wherein at least one hydrogen atom has been substituted with an atom other than hydrogen or carbon, including moieties in which a carbon chain atom is substituted with a hetero atom such as nitrogen, oxygen, silicon, phosphorous, boron, sulfur, or a halogen atom. These substituents include hydroxy; lower alkoxy such as methoxy, ethoxy, butoxy; halogen such as chloro or fluoro; ethers; esters; heteroaryl such as furyl or thienyl; alkanoxy; acyl; acyloxy; nitro; amino; and amido. In general, however, amines and silyl radicals are preferably excluded.

The acyl moieties and the acyloxy moieties described herein contain hydrocarbyl, substituted hydrocarbyl or heteroaryl moieties. In general, they have the formulas —C(O)G and —OC(O)G, respectively, wherein G is substituted or unsubstituted hydrocarbyl, hydrocarbyloxy, hydrocarbylamino, hydrocarbylthio or heteroaryl.

This invention will be further illustrated by the following Examples although it will be understood that these Examples are included merely for purposes of illustration and are not intended to limit the scope of the invention.

EXAMPLES

Test Procedures

The following test procedures were used to generate the data reported in the examples below:

Minimum Film Formation Temperature Measurement

The method used for measuring MFFT followed ASTM Method D2354-68. Minimum film formation temperatures for ten different coalescent aid formulated latexes were measured. Four replicate measurements were performed for the same latex and were then averaged.

Blocking Resistance Testing

The procedure employed to evaluate block resistance followed ASTM Method D4946-89. A 6 mil thick film of latex was drawn down on a Leneta chart and dried for 7 days room temperature. The dried films were cut into squares ~1.5×1.5 inch$^2$ and the squares were placed together with face to face contacted each other. The face-to-face specimens were placed in a 35° C. oven on the flat aluminum tray. A 1000 kg weight on a No. 8 stopper were placed on the specimens to yield a pressure of about 1.8 psi (127 g/cm$^2$). After exactly 30 min, the stopper and weight were removed. The sample was allowed to cool for 30 min at room temperature before determining the block resistance according to the following scale:
- 10 . . . no tack
- 9 trace tack
- 8 very slight tack
- 7 very slight to slight tack
- 6 slight tack
- 5 moderate tack
- 4 very tacky, no seal
- 3 5-25% seal
- 2 25-50% seal
- 1 50-75% seal
- 0 75-100% seal Adhesion Testing The method used to for determining adhesion followed ASTM Method D3359-92a. A 6 mil wet film thickness of latex was drawn down on an aluminum panel and dried for 7 days at room temperature. After drying, an area was selected that was free of blemishes and minor surface imperfections. Eleven cuts in each direction, orthogonal, were made through the film to the substrate in one steady motion using sufficient pressure on the cutting tool to have the cutting edge reach the substrate. Make all cuts about ¾ inch (20 mm). Place the center of the tape over the grid and in the area of the grid smooth into place by a finger. To ensure good contact with the film, rub the tape firmly with the eraser. The opacity change of the tape was a useful indication of when good contact has been made. Within 90 sec of application, remove the tape by seizing the free end and rapidly pull back upon itself at an angle of approximately 180°. Inspect the grid area for removal of coating from the substrate. Rate the adhesion in accordance with the following scale:
- 5B The edges of the cuts are completely smooth; none of the squares of the lattice is detached.
- 4B Small flakes of the coating are detached at intersections; less than 5% of the area is affected.
- 3B Small flakes of the coating are detached along edges and at intersections of cuts. The area affected is 5-15% of the lattice.
- 2B The coating has flaked along the edges and on parts of the squares. The area affected is 15-35% of the lattice.
- 1B The coating has flaked along the edges of cuts in large ribbon and whole squares have detached. The area affected is 35-65% of the lattice.
- 0B Flaking and detachment worse than grade 1B.

Freeze-Thaw and Thermal Stability

Three, 500 grams cans of paint had been prepared for each system being investigated. One was for freeze-thaw stability test, one for thermal stability test and the other one for control. The control samples were stored at room temperature.

For thermal stability testing, paint cans were put in oven at 50° C. for 17 hours, then was taken out to cool at room temperature for 7 hours. This is a cycles of testing. Repeat testing for at least 5 cycles and observed a physical appearance of paints in cans. Gloss and hiding power were measured and compared with those from control.

For freeze-thaw stability testing, one cycle composes of 17 hours of freezing in a refrigerator at −8° C. and 7 hours of thawing at room temperature. At least 5 cycles had been taken. The physical appearance of paints were observed. Gloss and hiding power were measured and compared with those from control.

Gloss and Hiding Power

Each paint formulation was drawn down onto a Lenetta chart with film thickness of 3 mils, and let dry at room temperature for two days before gloss (@60°) and hiding power measurement would be taken by glossmeter and color computer, respectively.

Scrub Resistance Testing

Each paint formulation was drawn down onto a plastic panel with 6 mil draw down bar and let dry at room temperature for 7 days before testing. The testing including scrub media preparation was by the method described in ASTM D 2486-89.

Pencil Hardness Testing

The method used for determining hardness followed ASTM Method D3363-92a. A 6 mil thickness film of latex was drawn down on an aluminum panel and dried for 7 days at room temperature. After drying, an area was selected that was free of blemishes and minor surface imperfections. The pencils was prepared by polishing the tip of the pencil in circular motion to get a sharp edge. The panel was placed on a firm horizontal surface. The pencil was held firmly against the film at a 45° angle (point away from operator) and pushed away from the operator in a ¼ in stroke. The pencil number that does not cut into or gauge the paint film was reported.

Evaporation Rate

Three samples of each coalescent aid was weighed into aluminum pans. All test samples were kept at room temperature. The percentage of weight loss of each coalescent aid was measured as a function of time.

Surface Tension

Surface tension was determined by the ring method tensiometer according to ASTM D 1331-89.

Hydrophilic Lipophilic Balance

Hydrophilic lipophilic balance (HLB) values were calculated from Equation 1 based on ethylene oxide moiety in the molecule.

$$HLB = \frac{\% \text{ wt. of ethylene oxide in the molecule}}{5} \quad \text{Equation 1}$$

Solubility Parameters

Solubility parameter values were calculated according to the Hansen Method from the Handbook of Solubility Parameters.

Density

Density was determined according to ASTM D-1475.

$^{13}$C NMR Spectra $^{13}$C NMR spectra were determined without solvent added at room temperature in 5-mm inner-diameter tubes.

$^1$H NMR Spectra $^1$H NMR spectra were operated with neat liquid reaction products.

Example 1

Coalescent efficiency using a low Tg latex polymer with various soybean oil esters.

Master batch formulation for MFFT testing of vinyl acetate latex, FLEXBOND 325, and vinyl acrylic latex, UCAR 379G is given in the Table below.

| Formulation for studying MFFT for low Tg latex polymers | | | | |
|---|---|---|---|---|
| | formulation | | solid content | |
| | lb. | gal. | lb. | gal. |
| H2O | 286.35 | 34.38 | 0.00 | 0.00 |
| PG | 43.20 | 4.99 | 0.00 | 0.00 |
| X-102 | 1.98 | 0.22 | 1.98 | 0.22 |
| RM825 | 1.82 | 0.21 | 0.46 | 0.05 |
| WET260 | 0.87 | 0.10 | 0.87 | 0.10 |
| AMP95 | 1.98 | 0.25 | 0.00 | 0.00 |
| low Tg resins | 430.22 | 47.54 | 236.62 | 24.44 |
| DREWPLUS 493 | 2.38 | 0.32 | 0.36 | 0.13 |
| H2O | 99.88 | 11.99 | 0.00 | 0.00 |
| Total | 868.69 | 100.00 | 240.29 | 24.94 |
| wt/gal | | 8.69 | | |
| % sol/wt | | 27.66 | | |
| % sol/vol. | | 24.94 | | |

Note:
In the batch formulations
PG = propylene glycol
X-102 = Triton X-102: surfactant (Union Carbide)
RM = Acrysol RM 825: associative thickener (Rohm & Haas)
WET260: wetting agent (Tego Chemical)
AMP 95: pH modifier (Angus)
Drewplus L-493: defoamer (Drew Chemical)

To 50 grams portion of master batch was added the coalescent aids at the following levels: 0.25 g (0.5%); 0.375 g (0.75%); 0.5 g (1.0%). The samples were equilibrated for 48 hours prior to determination of the minimum film formation temperature using a MFFT BAR-90 (Rhopoint Instrumentation Ltd, England).

Figure 1:
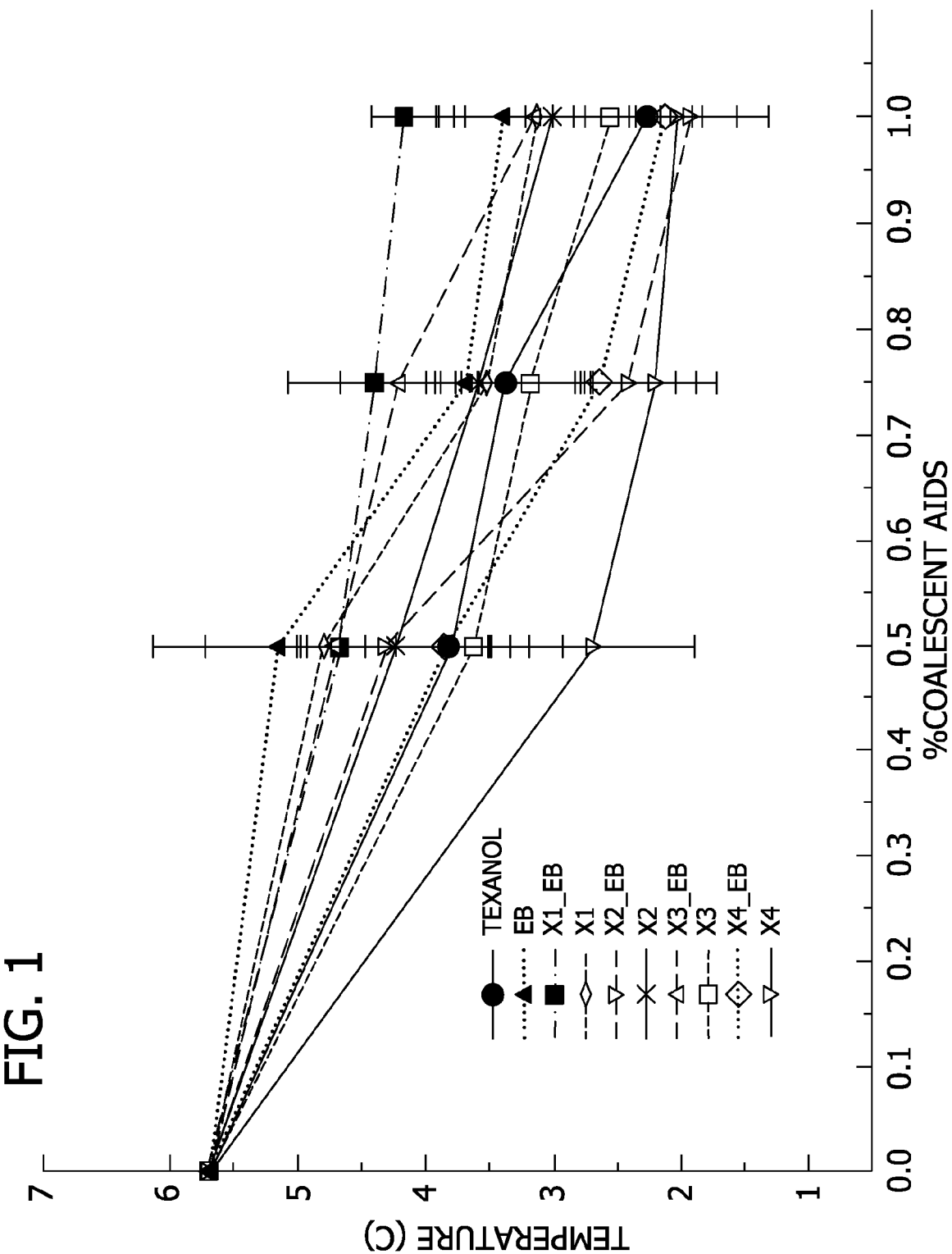
FIG. 1 is the MFFT (C) plot for FLEXBOND 325 as a function of % coalescent aids.

As illustrated by FIG. 1, all new soy oil glycol ester coalescent aids of this invention show a potential in lowering the minimum film formation temperature of latex polymer, FLEXBOND 325 similar to commercial coalescent aids TEXANOL® and EB.

Figure 2:
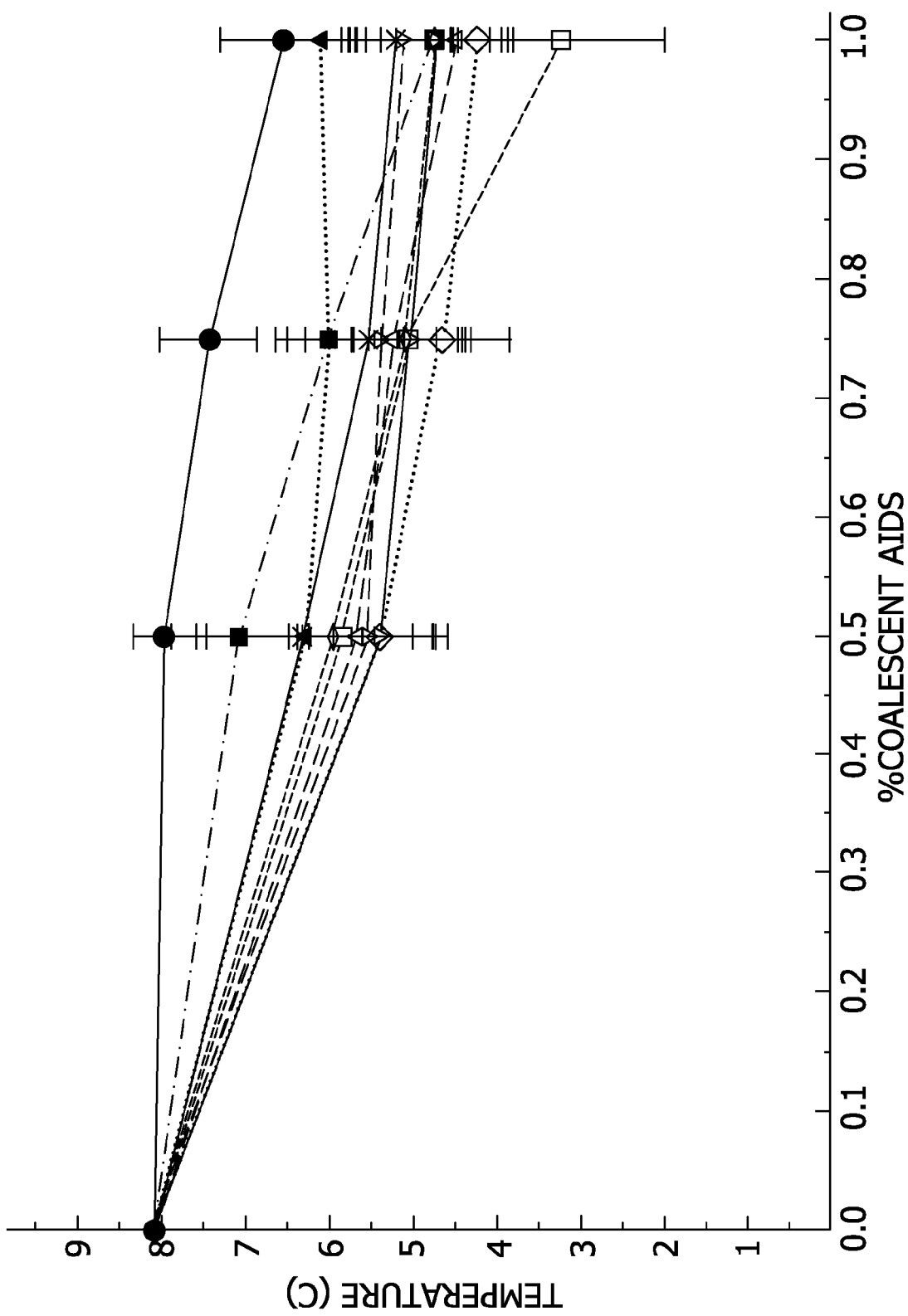
FIG. 2 is the MFFT (C) plot for UCAR 379 as a function of % coalescent aids.

As shown in FIG. 2, all new soy oil glycol ester coalescent aids of this invention show a capability in lowering the minimum film formation temperature of latex polymer, UCAR 379G, better than the commercial coalescent aid TEXANOL®, and also give a similar trend to the commercial coalescent aid EB.

Example 2

Coalescent efficiency using a high Tg latex polymer with various soybean oil glycol esters.

Master batch formulation for MFFT testing of high Tg acrylic latex, ACRONAL A846, is given in the Table below.

| Formulation for studying MFFT for ACRONAL A846 | | | | |
|---|---|---|---|---|
| | formulation | | solid content | |
| | lb. | gal. | lb. | gal. |
| H2O | 278.29 | 33.41 | 0.00 | 0.00 |
| PG | 42.40 | 4.90 | 0.00 | 0.00 |
| X-102 | 5.09 | 0.57 | 5.09 | 0.57 |
| RM825 | 3.85 | 0.44 | 0.96 | 0.10 |
| WET kl245 | 7.71 | 0.89 | 7.71 | 0.89 |
| AMP95 | 0.00 | 0.00 | 0.00 | 0.00 |
| Acronal486 | 418.60 | 47.84 | 209.30 | 22.82 |
| DREWPLUS | 2.16 | 0.29 | 0.32 | 0.12 |
| H2O | 97.13 | 11.66 | 0.00 | 0.00 |
| Total | 855.23 | 100.00 | 223.38 | 24.50 |
| wt/gal | | 8.55 | | |
| % sol/wt | | 26.12 | | |
| % sol/vol. | | 24.50 | | |

WET kl245: wetting agent

To 50 grams portion of master batch was added the coalescent aids at the following levels: 0.25 g (0.5%); 0.375 g (0.75%); 0.5 g (1.0%). The samples were equilibrated for 48 hours prior to determination of the minimum film formation temperature using a MFFT BAR-90 (Rhopoint Instrumentation Ltd, England).

Figure 3:
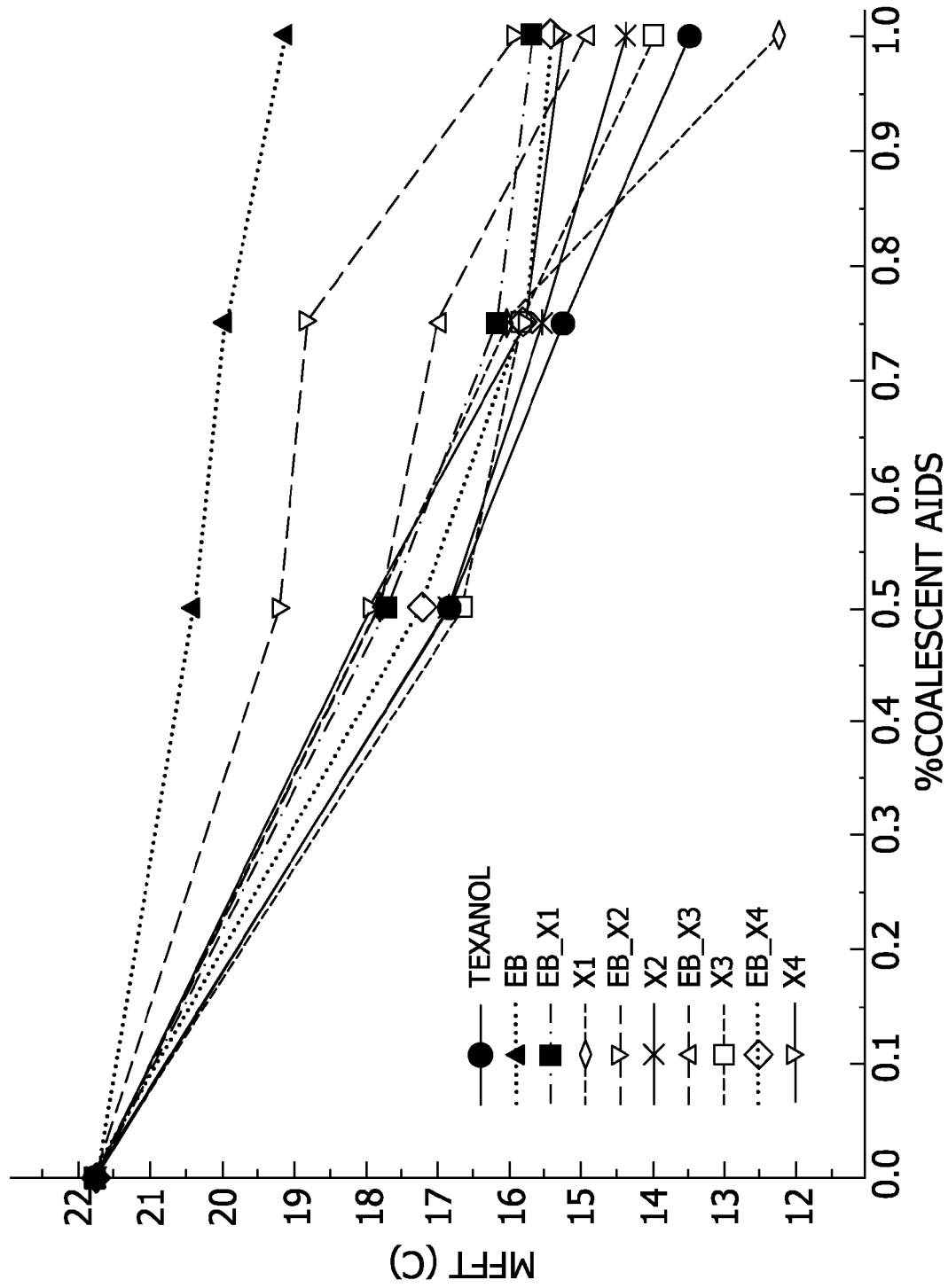
FIG. 3 is the MFFT (C) plot for ACRONAL A846 as a function of % coalescent aids.

As illustrated by FIG. 3, all new soy oil glycol ester coalescent aids of this invention show a capability in lowering the minimum film formation temperature of high Tg acrylic latex polymer, ACRONAL A846, better than the commercial coalescent aid EB, and also give a similar trend to the commercial coalescent aid TEXANOL® at every level of coalescent aids added.

Master batch formulation for MFFT testing of high Tg polystyrene/polymethyl methacrylate latex, UCAR 430, is given in the Table below.

| Formulation for studying MFFT for UCAR 430 | | | | |
|---|---|---|---|---|
| | formulation | | solid content | |
| | lb. | gal. | lb. | gal. |
| H2O | 288.56 | 34.64 | 0.00 | 0.00 |
| PG | 43.96 | 5.08 | 0.00 | 0.00 |
| X-102 | 5.28 | 0.59 | 5.28 | 0.59 |
| RM825 | 4.00 | 0.46 | 1.00 | 0.10 |
| WET kl245 | 7.99 | 0.92 | 7.99 | 0.92 |
| AMP95 | 0.00 | 0.00 | 0.00 | 0.00 |
| UCAR430 | 434.03 | 49.89 | 195.31 | 21.23 |
| DREWPLUS | 2.24 | 0.30 | 0.34 | 0.12 |
| H2O | 67.62 | 8.12 | 0.00 | 0.00 |
| Total | 853.68 | 100.00 | 209.92 | 22.97 |
| | wt/gal | 8.54 | | |
| | % sol/wt | 24.59 | | |
| | % sol/vol. | 22.97 | | |

To 50 gram portion of master batch was added the coalescent aids at the following levels: 0.25 g (0.5%); 0.375 g (0.75%); 0.5 g (1.0%). The samples were equilibrated for 48 hours prior to determination of the minimum film formation temperature using a MFFT BAR-90 (Rhopoint Instrumentation Ltd, England).

Figure 4:
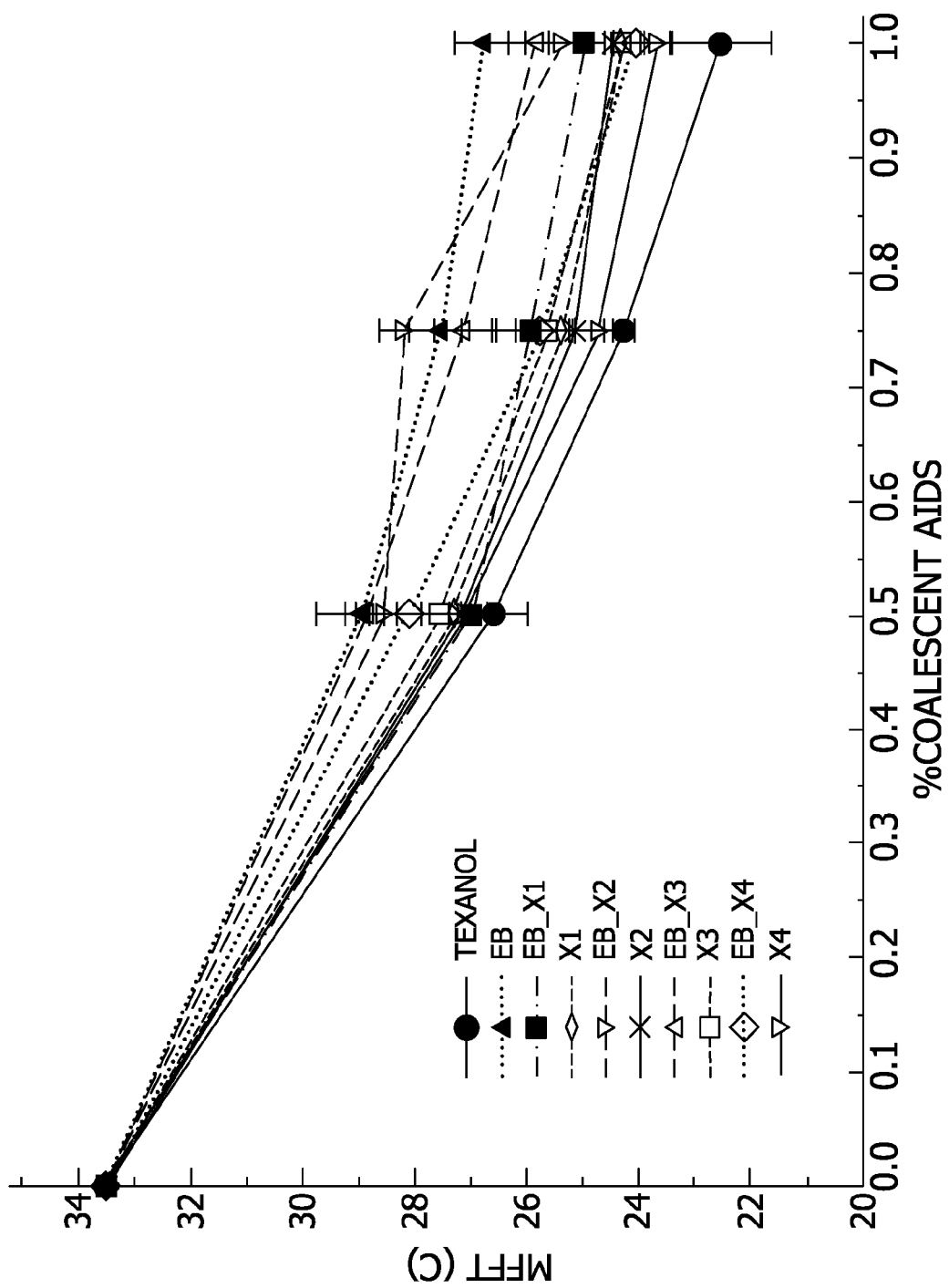
FIG. 4 is the MFFT (C) plot for UCAR 430 as a function of % coalescent aids.

As shown in FIG. 4, all new soy oil glycol ester coalescent aids of this invention show a capability in lowering the minimum film formation temperature of high Tg PS/PMMA latex polymer, UCAR 430, better than the commercial coalescent aid EB, and also give a similar trend to the commercial coalescent aid TEXANOL® at every level of coalescent aids added.

Example 3

Physical properties of paint formulations with a low Tg latex polymer with ethylene glycol soybean oil esters and TEXANOL®.

Semigloss and flat paint formulations of low Tg, vinyl acetate latex, FLEXBOND 325, have been prepared for physical testing. The formulations with TEXANOL® are given in the Tables below.

| GLOSS PAINT/FLEXBOND325/TEXANOL ® | | |
|---|---|---|
| | formulation | |
| | lb. | gal |
| H2O | 50.58 | 52.58 |
| PG | 58.28 | 6.74 |
| X-102 | 2.01 | 0.22 |
| RM825 | 15.70 | 1.80 |
| TAMOL850 | 8.29 | 0.84 |
| WET260 | 4.51 | 0.52 |
| AMP95 | 3.62 | 0.46 |
| TP-900 | 224.91 | 6.75 |
| ATOMITE | 73.46 | 3.25 |
| FXBD325 | 582.93 | 64.06 |
| TEXANOL ® | 18.92 | 2.39 |
| DREWPLUS | 1.91 | 0.26 |
| H2O | 55.19 | 6.62 |
| Total | 1100.30 | 100.00 |
| | wt/gal | 11.00 |
| | % sol/wt | 57.46 |
| | % sol/vol. | 44.39 |
| | % PVC | 22.55 |

TP-900: Titanium
ATOMITE: Calcium Carbonate

| FLAT PAINT/FLEXBOND325/TEXANOL ® | | |
|---|---|---|
| | formulation | |
| | lb. | gal |
| H2O | 141.83 | 17.03 |
| PG | 43.31 | 5.01 |
| X-102 | 2.17 | 0.24 |
| RM825 | 20.77 | 2.39 |
| TAMOL850 | 18.08 | 1.83 |
| WET260 | 4.85 | 0.56 |
| AMP95 | 2.17 | 0.28 |
| TP-900 | 241.98 | 7.27 |
| ATOMITE | 194.88 | 8.63 |
| FXBD325 | 433.07 | 47.59 |
| TEXANOL ® | 14.07 | 1.78 |
| DREWPLUS | 2.06 | 0.27 |
| H2O | 59.37 | 7.13 |
| Total | 1178.61 | 100.00 |
| | wt/gal | 11.79 |
| | % sol/wt | 58.80 |
| | % sol/vol. | 42.22 |
| | % PVC | 37.66 |

FXBD 325 = Flexbond 325

The formulations with ethylene glycol derivative soybean oil glycol esters are given in the Tables below.

| GLOSS PAINT/FLEXBOND325/SYNTHETIC COALESCENT AID | | |
|---|---|---|
| | formulation (by weight) lb. | formulation (by volume) gal. |
| H2O | 77.67 | 9.32 |
| PG | 56.05 | 6.48 |
| X-102 | 1.84 | 0.20 |
| RM825 | 17.42 | 2.00 |
| TAMOL850 | 7.97 | 0.81 |
| WET260 | 4.34 | 0.50 |
| AMP95 | 4.24 | 0.54 |
| TP-900 | 216.28 | 6.49 |
| ATOMITE | 70.64 | 3.13 |
| FXBD325 | 560.56 | 61.60 |
| EG-DERIV(X1) | 18.19 | 2.30 |
| DREWPLUS | 1.84 | 0.25 |
| H2O | 53.07 | 6.37 |
| Total | 1090.09 | 100.00 |
| | wt/gal | 10.90 |
| | % sol/wt | 55.81 |
| | % sol/vol. | 42.73 |
| | % PVC | 22.52 |

EG-DERIV(X1) = Ethylene glycol soy oil ester

| FLAT PAINT/FLEXBOND325/SYNTHETIC COALESCENT AID | | |
|---|---|---|
| | formulation (by weight) lb. | formulation (by volume) gal. |
| H2O | 142.58 | 17.12 |
| PG | 43.53 | 5.03 |
| X-102 | 2.18 | 0.24 |
| RM825 | 15.96 | 1.83 |
| TAMOL850 | 18.18 | 1.84 |
| WET260 | 4.88 | 0.56 |
| AMP95 | 2.18 | 0.28 |
| TP-900 | 243.25 | 7.30 |
| ATOMITE | 195.91 | 8.68 |
| FXBD325 | 435.34 | 47.84 |

FLAT PAINT/FLEXBOND325/SYNTHETIC COALESCENT AID -continued

|  | formulation (by weight) lb. | formulation (by volume) gal. |
|---|---|---|
| EG-DERIV (X1) | 14.15 | 1.79 |
| DREWPLUS | 2.37 | 0.32 |
| H2O | 59.69 | 7.17 |
| Total | 1180.18 | 100.00 |
|  | wt/gal | 11.80 |
|  | % sol/wt | 58.93 |
|  | % sol/vol. | 42.33 |
|  | % PVC | 37.76 |

Semigloss and flat paint formulations of low Tg vinyl acrylic latex, UCAR 379G, have been prepared for physical testing. The formulations with TEXANOL® are given in the Tables below.

GLOSS PAINT/UCAR379G/TEXANOL®

|  | formulation (by weight) lb. | formulation (by volume) gal. |
|---|---|---|
| H2O | 37.19 | 4.47 |
| PG | 72.80 | 8.42 |
| X-102 | 2.01 | 0.22 |
| RM825 | 17.08 | 1.96 |
| TAMOL850 | 7.89 | 0.80 |
| WET260 | 4.53 | 0.52 |
| AMP95 | 1.41 | 0.18 |
|  |  | 0.00 |
| TP-900 | 226.02 | 6.79 |
| ATOMITE | 74.15 | 3.29 |
|  |  | 0.00 |
| UCAR379 | 587.51 | 64.92 |
| TEXANOL® | 33.45 | 4.23 |
| DREWPLUS | 1.93 | 0.26 |
| H2O | 32.88 | 3.95 |
| Total | 1098.86 | 100.00 |
|  | wt/gal | 10.99 |
|  | % sol/wt | 57.95 |
|  | % sol/vol. | 44.91 |
|  | % PVC | 22.43 |

FLAT PAINT/UCAR379G/TEXANOL®

|  | formulation (by weight) lb. | formulation (by volume) gal. |
|---|---|---|
| H2O | 132.28 | 15.88 |
| PG | 54.86 | 6.34 |
| X-102 | 2.21 | 0.25 |
| RM825 | 17.19 | 1.98 |
| TAMOL850 | 18.47 | 1.87 |
| WET260 | 4.98 | 0.58 |
| AMP95 | 1.11 | 0.14 |
|  |  | 0.00 |
| TP-900 | 248.28 | 7.46 |
| ATOMITE | 199.08 | 8.82 |
|  |  | 0.00 |
| UCAR379 | 442.41 | 48.89 |
| TEXANOL® | 25.22 | 3.19 |
| DREWPLUS | 2.12 | 0.28 |
| H2O | 36.12 | 4.34 |
| Total | 1184.33 | 100.00 |
|  | wt/gal | 11.84 |

FLAT PAINT/UCAR379G/TEXANOL® -continued

|  | formulation (by weight) lb. | formulation (by volume) gal. |
|---|---|---|
| % sol/wt |  | 59.78 |
| % sol/vol. |  | 43.19 |
| % PVC |  | 37.68 |

The formulations with ethylene glycol soybean oil esters are given in the Tables below

GLOSS PAINT/UCAR379G/SYNTHETIC COALESCENT AID

|  | formulation (by weight) lb. | formulation (by volume) gal. |
|---|---|---|
| H2O | 82.21 | 9.87 |
| PG | 68.37 | 7.90 |
| X-102 | 1.89 | 0.21 |
| RM825 | 18.91 | 2.17 |
| TAMOL850 | 7.94 | 0.80 |
| WET260 | 4.48 | 0.52 |
| AMP95 | 1.32 | 0.17 |
|  |  | 0.00 |
| TP-900 | 212.27 | 6.37 |
| ATOMITE | 69.63 | 3.09 |
|  |  | 0.00 |
| UCAR379 | 551.76 | 60.97 |
| EG DERIV (X1) | 31.41 | 3.98 |
| DREWPLUS | 1.82 | 0.24 |
| H2O | 30.88 | 3.71 |
| Total | 1082.90 | 100.00 |
|  | wt/gal | 10.83 |
|  | % sol/wt | 55.33 |
|  | % sol/vol. | 42.29 |
|  | % PVC | 22.37 |

FLAT PAINT/UCAR379G/SYNTHETIC COALESCENT AID

|  | formulation (by weight) lb. | formulation (by volume) gal. |
|---|---|---|
| H2O | 133.08 | 15.98 |
| PG | 55.19 | 6.38 |
| X-102 | 2.23 | 0.25 |
| RM825 | 11.57 | 1.33 |
| TAMOL850 | 19.14 | 1.93 |
| WET260 | 5.01 | 0.58 |
| AMP95 | 1.11 | 0.14 |
|  |  | 0.00 |
| TP-900 | 249.77 | 7.50 |
| ATOMITE | 200.28 | 8.87 |
|  |  | 0.00 |
| UCAR379 | 445.07 | 49.18 |
| EG DERIV (X1) | 25.37 | 3.21 |
| DREWPLUS | 2.14 | 0.29 |
| H2O | 36.34 | 4.36 |
| Total | 1186.29 | 100.00 |
|  | Wt/gal | 11.86 |
|  | % sol/wt | 59.94 |
|  | % sol/vol. | 43.32 |
|  | % PVC | 37.80 |

Results

The physical property testing results are shown in the Table below.

FREEZE-THAW STABILITY AND THERMAL STABILITY TESTING

| | Viscosity (cps) | Hiding power | gloss @ 60° | physical appearance |
|---|---|---|---|---|
| gloss/ucar/TEXANOL ® | | | | |
| Control | 1785 | 94.4 | 20.7/17 | no settling |
| Oven | 1985 | 94.0 | 17.7/14.3 | no settling |
| Freezer | 1775 | 94.8 | 20.5/17.4 | no settling |
| gloss/flexbond/TEXANOL ® | | | | |
| Control | 1735 | 95.2 | 26.7/24.2 | no settling |
| Oven | 1715 | 94.4 | 25.3/21.4 | no settling |
| Freezer | 1570 | 95.4 | 27.8/24.2 | no settling |
| flat/ucar/TEXANOL ® | | | | |
| Control | 1345 | 95.8 | 3.6/3.4 | no settling |
| oven | 1375 | 94.9 | 3.4/3.3 | no settling |
| freezer | 1260 | 95.0 | 3.5/3.3 | no settling |
| flat/flexbond/TEXANOL ® | | | | |
| control | 1965 | 94.2 | 4.5/4.9 | no settling |
| oven | 1885 | 93.8 | 4.2/4.6 | no settling |
| freezer | 1505 | 94.3 | 4.6/4.8 | no settling |
| gloss/ucar/synthetic coalescent aid | | | | |
| Control | 2005 | 93.9 | 21.0/17.7 | no settling |
| oven | 1610 | 92.7 | 18.8/16.4 | no settling |
| freezer | 2235 | 93.7 | 21.1/18.4 | no settling |

FREEZE-THAW STABILITY AND THERMAL STABILITY TESTING cont.

| | Viscosity (cps) | Hiding power | gloss @ 60° | physical appearance |
|---|---|---|---|---|
| gloss/flexbond/synthetic coalescent aid | | | | |
| control | 1170 | 95.3 | 26.8/23.6 | no settling |
| oven | 1170 | 94.4 | 25.3/20.7 | no settling |
| freezer | 1120 | 95.1 | 26.8/22.6 | no settling |
| flat/ucar/synthetic coalescent aid | | | | |
| control | 1985 | 94.9 | 5.1/4.3 | no settling |
| oven | 2135 | 94.1 | 4.7/4.0 | no settling |
| freezer | 1870 | 93.9 | 4.8/4.2 | no settling |
| flat/flexbond/synthetic coalescent aid | | | | |
| control | 1580 | 94.2 | 5.4/5.2 | no settling |
| oven | 1540 | 93.8 | 4.7/4.8 | no settling |
| freezer | 1390 | 94.7 | 5.4/5.3 | no settling |

The incorporation of ethylene glycol soy oil ester as a coalescent aid in paint formulations with low Tg latex polymers exhibited thermal stability and freeze-thaw stability similar to commercial coalescent aid, TEXANOL® (Eastman Kodak). There was no settling in all paint formulations. The gloss and hiding power were stable in all paint formulation after freeze-thaw and heat-cool for at least 5 cycles.

SCRUB RESISTANCE TESTING RESULTS

| | Scrub resistant (cycles) |
|---|---|
| gloss/ucar/TEXANOL ® | >3000 |
| gloss/flexbond/TEXANOL ® | >3000 |
| flat/ucar/TEXANOL ® | >3000 |
| flat/flexbond/TEXANOL ® | >3000 |
| gloss/ucar/synthetic coalescent aid | >3000 |
| gloss/flexbond/synthetic coalescent aid | >3000 |
| flat/ucar/synthetic coalescent aid | >3000 |
| flat/flexbond/synthetic coalescent aid | >3000 |

The scrub resistance of paint formulations formulated with ethylene glycol soy oil ester as a coalescent aid showed an excellent scrub resistance similar to paint formulations with commercial coalescent aid, TEXANOL® (Eastman Kodak). Both of low Tg latex polymers used in this invention gave the same result in scrub resistance.

BLOCKING RESISTANCE TESTING RESULTS

| | Blocking resistant rating | Performance |
|---|---|---|
| SEMIGLOSS | | |
| Flexbond325 + TEXANOL ® | 2.0 | 25-50% seal |
| Flexbond325 + Methyl Ester | 3.0-4.0 | Poor-fair |
| Flexbond325 + EG-derivative | 6.0-7.0 | Good-very good |
| Ucar379g + TEXANOL ® | 3.0-4.0 | Poor-fair |
| Ucar379g + Methyl Ester | 3.0 | Poor |
| Ucar379g + EG-derivative | 5.0 | Fair |
| FLAT | | |
| Flexbond325 + TEXANOL ® | 7.0 | Good-very good |
| Flexbond325 + Methyl Ester | 5.0-6.0 | Fair-good |
| Flexbond325 + EG-derivative | 6.0 | Good |
| Ucar379g + TEXANOL ® | 7.0-8.0 | Good-very good |
| Ucar379g + Methyl Ester | 6.0-7.0 | Good |
| Ucar379g + EG-derivative | 4.0-5.0 | Fair |

Semigloss paint formulation with ethylene glycol soy oil ester as a coalescent aid showed better blocking resistance than paint formulation with comparative coalescent aid, TEXANOL® (Eastman Kodak). Flat paint formulation with ethylene glycol soy oil ester as a coalescent aid showed poorer blocking resistance than paint formulation with comparative coalescent aid, TEXANOL® (Eastman Kodak). Both low Tg latex polymers used in this invention provided the same trend of blocking resistance performance.

PENCIL HARDNESS TEST RESULTS

| | Hardness rating |
|---|---|
| GLOSS | |
| Flexbond325 + TEXANOL ® | 5B |
| Flexbond325 + X1 | 5B-6B |
| ucar379g + TEXANOL ® | 6B |
| ucar379g + X1 | OVER 6B |
| FLAT | |
| Flexbond325 + TEXANOL ® | 4B |
| Flexbond325 + X1 | 4B-5B |

-continued

PENCIL HARDNESS TEST RESULTS

| | Hardness rating |
|---|---|
| ucar379g + TEXANOL ® | 5B-6B |
| ucar379g + X1 | 6B |

Hardness of film from paint formulation with ethylene glycol soy oil ester as a coalescent aid was lower in hardness than the film from paint formulated with the commercial coalescent aid, TEXANOL® (Eastman Kodak). Both of low Tg latex polymers used in this invention provided less hardness with the new coalescent aid.

ADHESION TEST RESULTS

| | Surface of cross-cut area from which flaking has occurred | |
|---|---|---|
| | on scratched panel | with epoxy primer |
| GLOSS | | |
| Flexbond325 + TEXANOL ® | >65% | >65% |
| Flexbond325 + me-ester | >65% | >65% |
| Flexbond325 + X1 | >65% | >65% |
| Ucar379g + TEXANOL ® | >65% | >65% |
| Ucar379g + Me-ester | >65% | >65% |
| ucar379g + X1 | >65% | >65% |
| FLAT | | |
| Flexbond325 + TEXANOL ® | >65% | >65% |
| Flexbond325 + me-ester | >65% | >65% |
| Flexbond325 + X1 | >65% | >65% |
| Ucar379g + TEXANOL ® | >65% | >65% |
| Ucar379g + Me-ester | >65% | >65% |
| Ucar379g + X1 | >65% | >65% |

The semigloss and flat paint formulation, with both low Tg latex polymers and ethylene glycol soy oil ester as a coalescent aid, exhibited poor performance in adhesion of paint film both on scratched aluminum panel and on epoxy-primed aluminum panel. The same poor performance occurred with commercial coalescent aid, TEXANOL® (Eastman Kodak).

Example 4

Physical properties of paint formulations with a high Tg latex polymer with ethylene glycol soybean oil esters and TEXANOL®. Only the ethylene glycol soy oil ester derivative has been incorporated into a paint formulation for physical testing relative to the commercial coalescent aids, TEXANOL® (a commercial coalescent aid), and EB.

Semigloss paint formulation of high Tg acrylic latex, ACRONAL A846, has been prepared for physical testing. The formulations with TEXANOL® are given in the Table below.

ACRONAL846/TEXANOL ®

| | Formulation (by weight) lb. | formulation (by volume) gal. |
|---|---|---|
| H2O | 75.18 | 9.03 |
| PG | 63.05 | 7.29 |
| X-102 | 6.57 | 0.73 |
| RM825 | 16.05 | 1.84 |

ACRONAL846/TEXANOL ®

| | Formulation (by weight) lb. | formulation (by volume) gal. |
|---|---|---|
| TAMOL850 | 2.41 | 0.24 |
| WET KL245 | 12.81 | 1.48 |
| AMP95 | 0.14 | 0.02 |
| TP-900 | 169.75 | 5.10 |
| ATOMITE | 98.76 | 4.38 |
| ACRONAL A846 | 540.11 | 61.73 |
| TEXANOL ® | 27.07 | 3.43 |
| DREWPLUS L493 | 5.25 | 0.70 |
| H2O | 33.64 | 4.04 |
| Total | 1050.79 | 100.00 |
| wt/gal | | 10.51 |
| % sol/wt | | 53.62 |
| % sol/vol. | | 41.88 |
| % PVC | | 22.62 |

The formulations with ethylene glycol soybean oil esters are given in the Table below.

ACRONAL846/EG

| | Formulation (by weight) lb. | formulation (by volume) gal. |
|---|---|---|
| H2O | 75.57 | 9.07 |
| PG | 63.38 | 7.33 |
| X-102 | 6.61 | 0.74 |
| RM825 | 11.48 | 1.32 |
| TAMOL850 | 2.42 | 0.24 |
| WET KL245 | 12.87 | 1.49 |
| AMP95 | 0.14 | 0.02 |
| TP-900 | 170.63 | 5.12 |
| ATOMITE | 99.27 | 4.40 |
| ACRONAL A846 | 542.91 | 62.05 |
| EG-derivative | 27.21 | 3.46 |
| DREWPLUS L493 | 5.27 | 0.70 |
| H2O | 33.82 | 4.06 |
| Total | 1051.58 | 100.00 |
| wt/gal | | 10.52 |
| % sol/wt | | 56.34 |
| % sol/vol. | | 45.44 |
| % PVC | | 20.95 |

Semigloss paint formulation of high Tg PS/PMMA latex, UCAR 430, has been prepared for physical testing. The formulations with ethylene glycol soybean oil esters or TEXANOL® are given in the Tables below.

UCAR430/TEXANOL ®

| | Formulation (by weight) lb. | formulation (by volume) gal. |
|---|---|---|
| H2O | 79.51 | 9.55 |
| PG | 55.69 | 6.44 |
| X-102 | 6.71 | 0.75 |
| RM825 | 22.32 | 2.57 |
| TAMOL850 | 3.05 | 0.31 |
| WET KL245 | 9.67 | 1.12 |
| AMP95 | 0.28 | 0.04 |
| TP-900 | 162.60 | 4.88 |
| ATOMITE | 89.43 | 3.96 |
| UCAR430 | 548.78 | 63.08 |
| TEXANOL ® | 36.99 | 4.68 |
| DREWPLUS L493 | 2.56 | 0.34 |

-continued

UCAR430/TEXANOL ®

| | Formulation (by weight) lb. | formulation (by volume) gal. |
|---|---|---|
| H2O | 19.11 | 2.29 |
| | 1036.70 | 100.00 |
| | wt/gal | 10.37 |
| | % sol/wt | 50.38 |
| | % sol/vol. | 38.62 |
| | % PVC | 22.90 |

UCAR430/EG

| | formulation (by weight) lb. | formulation (by volume) gal |
|---|---|---|
| H2O | 80.01 | 9.61 |
| PG | 56.04 | 6.48 |
| X-102 | 6.75 | 0.75 |
| RM825 | 17.51 | 2.01 |
| TAMOL850 | 3.07 | 0.31 |
| WET KL245 | 9.74 | 1.13 |
| AMP95 | 0.29 | 0.04 |
| TP-900 | 163.62 | 4.91 |
| ATOMITE | 89.99 | 3.99 |
| UCAR430 | 552.22 | 63.47 |
| EG-derivative | 37.22 | 4.74 |
| DREWPLUS L493 | 1.96 | 0.26 |
| H2O | 19.23 | 2.31 |
| | 1037.64 | 100.00 |
| | wt/gal | 10.38 |
| | % sol/wt | 54.10 |
| | % sol/vol. | 43.44 |
| | % PVC | 20.49 |

Results

The physical property testing results are shown in Table below.

FREEZE-THAW AND THERMAL STABILITIES

| Semigloss high Tg latex | hiding power | gloss @ 60° | physical appearance |
|---|---|---|---|
| Ucar 430 + TEXANOL ® | | | |
| Control | 92 | 26.6/21.1 | no settling |
| Oven | 90 | 21.0/17.0 | no settling |
| Freezer | 91.5 | 26.6/21.2 | no settling |
| Ucar 430 + EG-derivative | | | |
| Control | 93 | 33.9/25.9 | no settling |
| Oven | 92 | 33.1/24.2 | no settling |
| Freezer | 93 | 33.0/26.6 | no settling |
| Acronal A846 + TEXANOL ® | | | |
| Control | 94 | 29.5/23.3 | no settling |
| Oven | 95 | 31.2/24.8 | no settling |
| Freezer | 94 | 29.1/28.4 | no settling |
| Acronal A846 + EG-derivative | | | |
| Control | 94 | 34.6/26.1 | no settling |
| Oven | 95 | 35.3/18.7 | no settling |
| Freezer | 95 | 34.8/24.5 | no settling |

From the results, the incorporation of ethylene glycol soy oil ester as a coalescent aid in paint formulations with high Tg latex polymers showed thermal stability and freeze-thaw stability similar to commercial coalescent aid, TEXANOL® (Eastman Kodak). There was no settling in all paint formulations. The gloss and hiding power were stable in all paint formulation after freeze-thaw and heat-cool for at least 5 cycles. Paint formulation with the new coalescent aid manifested the improvement in gloss relatively to conventional coalescent aid incorporated formulation.

SCRUB RESISTANCE TESTING RESULTS

| Semigloss paint | Scrub resistance (cycles) |
|---|---|
| Acronal A846 + TEXANOL ® | 748 |
| Acronal A846 + Methyl Ester | 782 |
| Acronal A846 + EG-derivative | 995 |
| Ucar 430 + TEXANOL ® | 687 |
| Ucar 430 + Methyl Ester | 755 |
| Ucar 430 + EG-derivative | 783 |

The scrub resistance of paint formulation with ethylene glycol soy oil ester as a coalescent aid show better scrub resistance than paint formulation with commercial coalescent aid, TEXANOL® (Eastman Kodak). Both of high Tg latex polymers used in this invention gave the same trend in scrub resistance.

BLOCKING RESISTANCE TESTING RESULTS

| | Blocking resistance rating | Performance |
|---|---|---|
| Acronal A846 + TEXANOL ® | 5.0-6.0 | Fair-good |
| Acronal A846 + Methyl Ester | 5.0-6.0 | Fair-good |
| AcromalA846 + EG-derivative | 6.0-7.0 | Good-very good |
| Ucar 430 + TEXANOL ® | 8.0 | Very good |
| Ucar 430 + Methyl Ester | 8.0 | Very good |
| Ucar 430 + EG-derivative | 9.0 | Excellent |

Paint formulation with ethylene glycol soy oil ester as a coalescent aid showed better blocking resistance than paint formulation with the commercial coalescent aid, TEXANOL® (Eastman Kodak). Both of high Tg latex polymers used in this invention provided good blocking resistance.

PENCIL HARDNESS TEST RESULTS

| Semigloss paint | Hardness rating |
|---|---|
| Acronal A846 + TEXANOL ® | 2B |
| Acronal A846 + Methyl Ester | 2B |
| Acronal A846 + EG-derivative | 3B |
| Ucar 430 + TEXANOL ® | 4B |
| Ucar 430 + Methyl Ester | 4B |
| Ucar 430 + EG-derivative | 5B |

Hardness of film from paint formulation with ethylene glycol soy oil ester as a coalescent aid was lower than hardness of film from paint formulation with the commercial coalescent aid, TEXANOL® (Eastman Kodak). Both of high Tg latex polymers used in this invention provided less hardness.

ADHESION TEST

| Semigloss high Tg latex | Surface of cross-cut area from which flaking has occurred (with epoxy primer) |
| --- | --- |
| Acronal A846 + TEXANOL ® | >65% |
| Acronal A846 + Methyl Ester | >65% |
| Acronal A846 + EG-derivative | >65% |
| Ucar 430 + TEXANOL ® | >65% |
| Ucar 430 + Methyl Ester | >65% |
| Ucar 430 + EG-derivative | >65% |

Paint formulation with both high Tg latex polymers and ethylene glycol soy oil ester as a coalescent aid, exhibited poor performance in adhesion of paint film on epoxy-primed aluminum panel. The same poor performance occurred with the commercial coalescent aid, TEXANOL® (Eastman Kodak).

Example 5

Evaporation rate of new glycol derivative soy oil ester relatively to conventional coalescent aids, TEXANOL® (Eastman Kodak) and Ethylene glycol n-Butyl ether (Union Carbide).

Weighed three replicas of each coalescent aid into aluminum pans. Keep all aluminum pans with coalescent at room temperature. The percentage of weight loss of each coalescent aid was measured.

The evaporation rate of ethylene glycol, propylene glycol and methyl ester derivatives as well as TEXANOL® (Eastman Kodak) and Ethylene glycol n-Butyl ether (EB, Union Carbide) are shown below in FIG. 5.

The evaporation rates of glycol derivative and methyl soy oil ester are lower than comparative coalescent aids (TEXANOL® and EB). Ethylene glycol monobutyl ether is water-soluble coalescent aid and evaporate from the film and is therefore a VOC. TEXANOL®, water-insoluble coalescent aid could gradually evaporate from the film while it is aging. The new soy oil glycol ester in this invention does not show a loss in weight. This means new soy oil glycol ester would become a part of coating film, and does not give off VOCs. The data indicates a slight but real increase in weight after 2 days consistent with a drying oil reacting slowly with air to cure.

MFFT Measurement with the Incorporation of Glycol Palmitate, Oleate and Linoleate.

Ethylene glycol derivatives of palmitic acid, oleic acid and linoleic acid were added to coatings formulated with high Tg resin (Ucar 430 and Acronal A846) at levels of 0.5%, 0.75% and 1.0% by weight. The formulations were equilibrated for two days before taking MFFT measurement.

The MFFT results are shown in FIGS. 6-9.

UCAR 430

Figure 6:
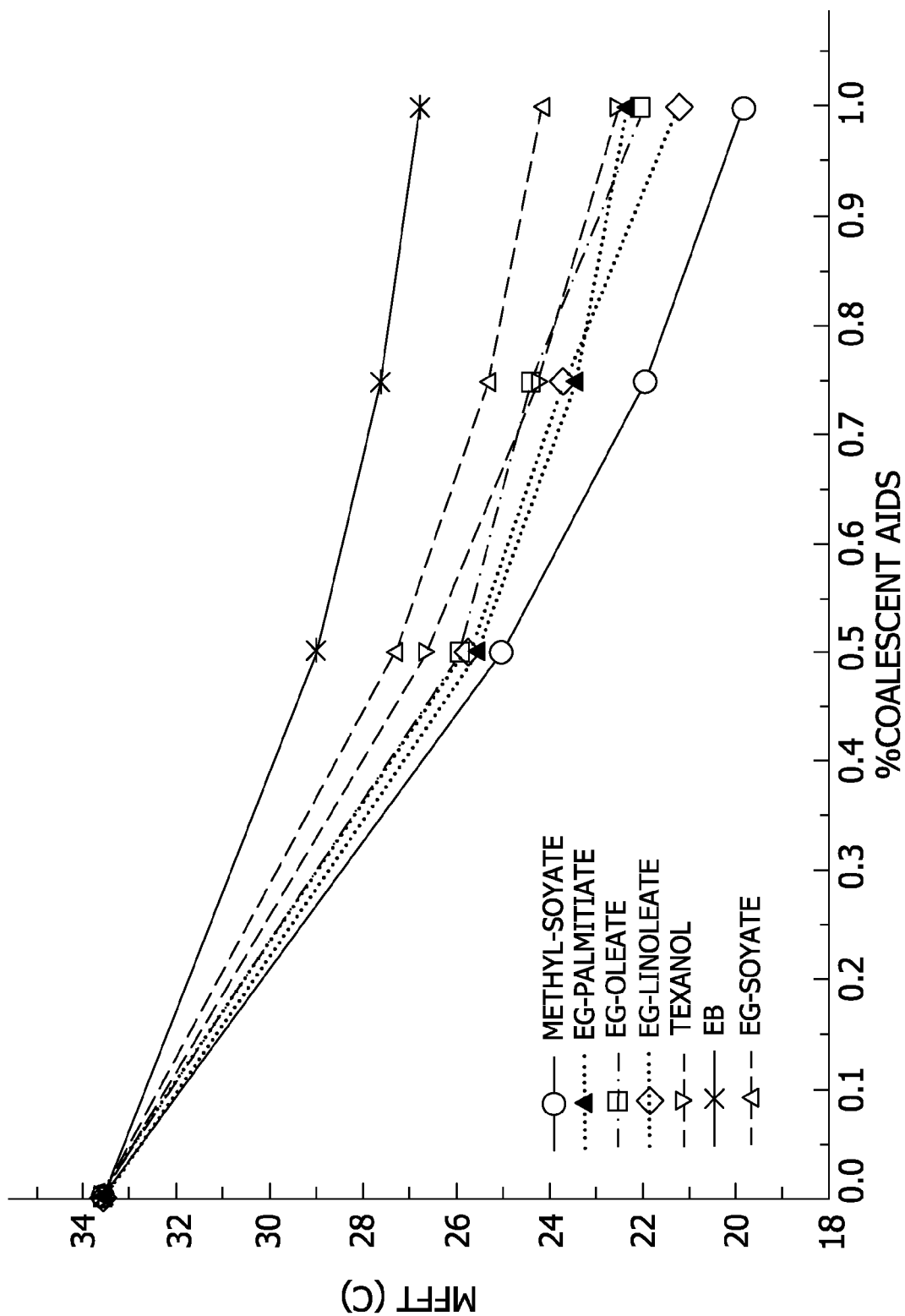
FIG. 6 is the MFFT plot for UCAR 430 as a function of coalescent aids.
Figure 7:
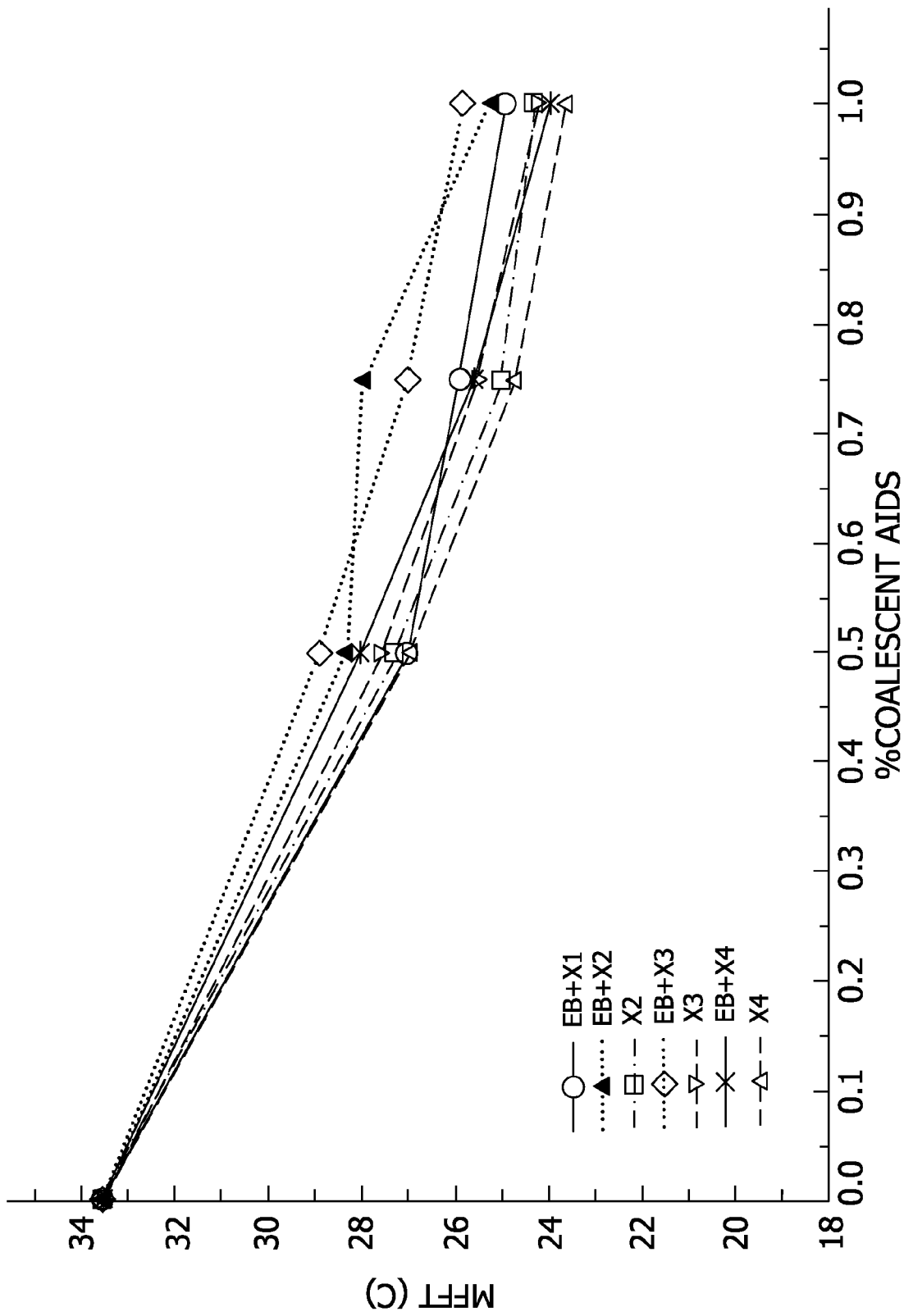
FIG. 7 is the MFFT plot for UCAR 430 as a function of coalescent aids.
Figure 8:
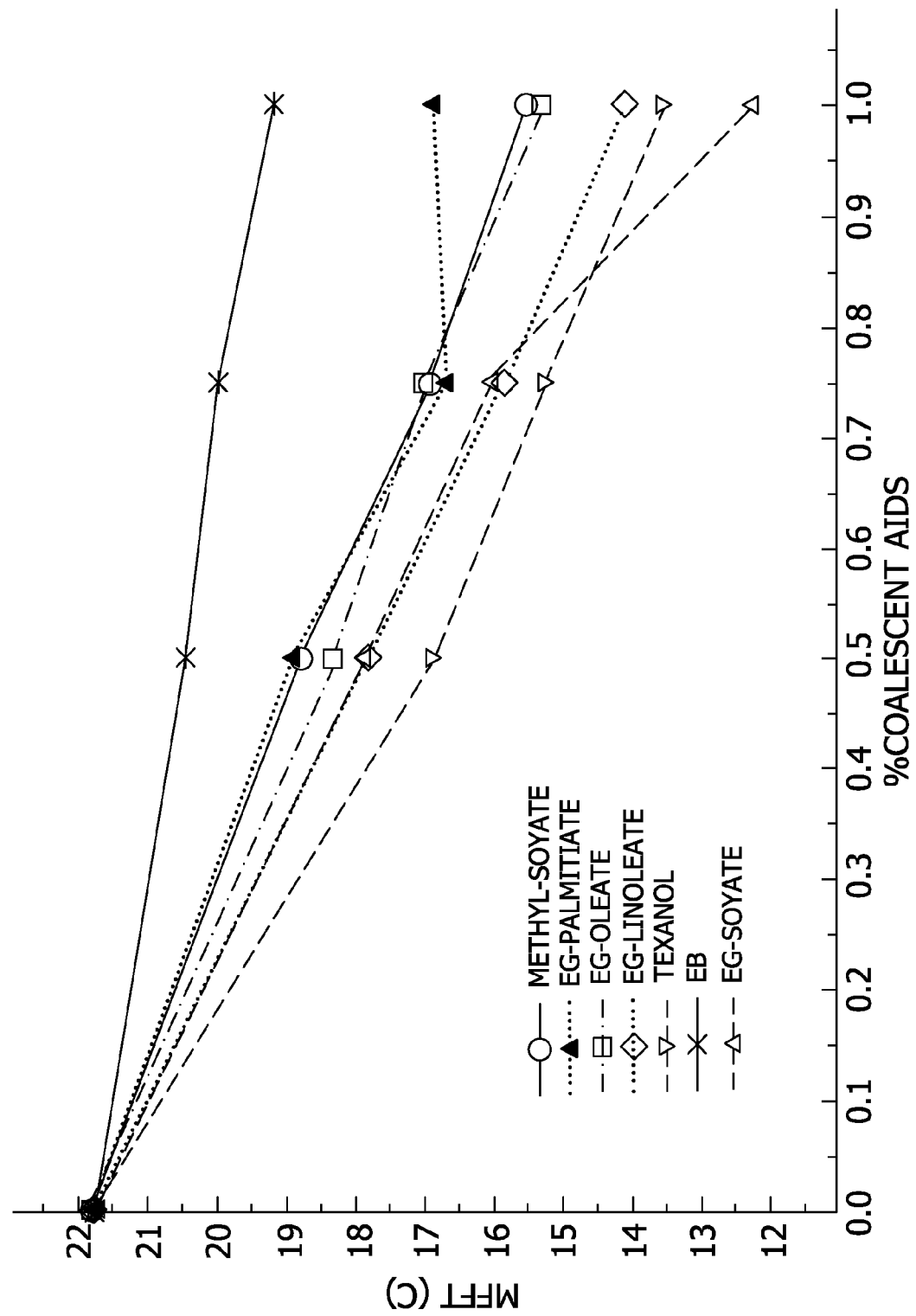
FIG. 8 is the MFFT plot for ACRONAL A846 as a function of coalescent aids.
Figure 9:
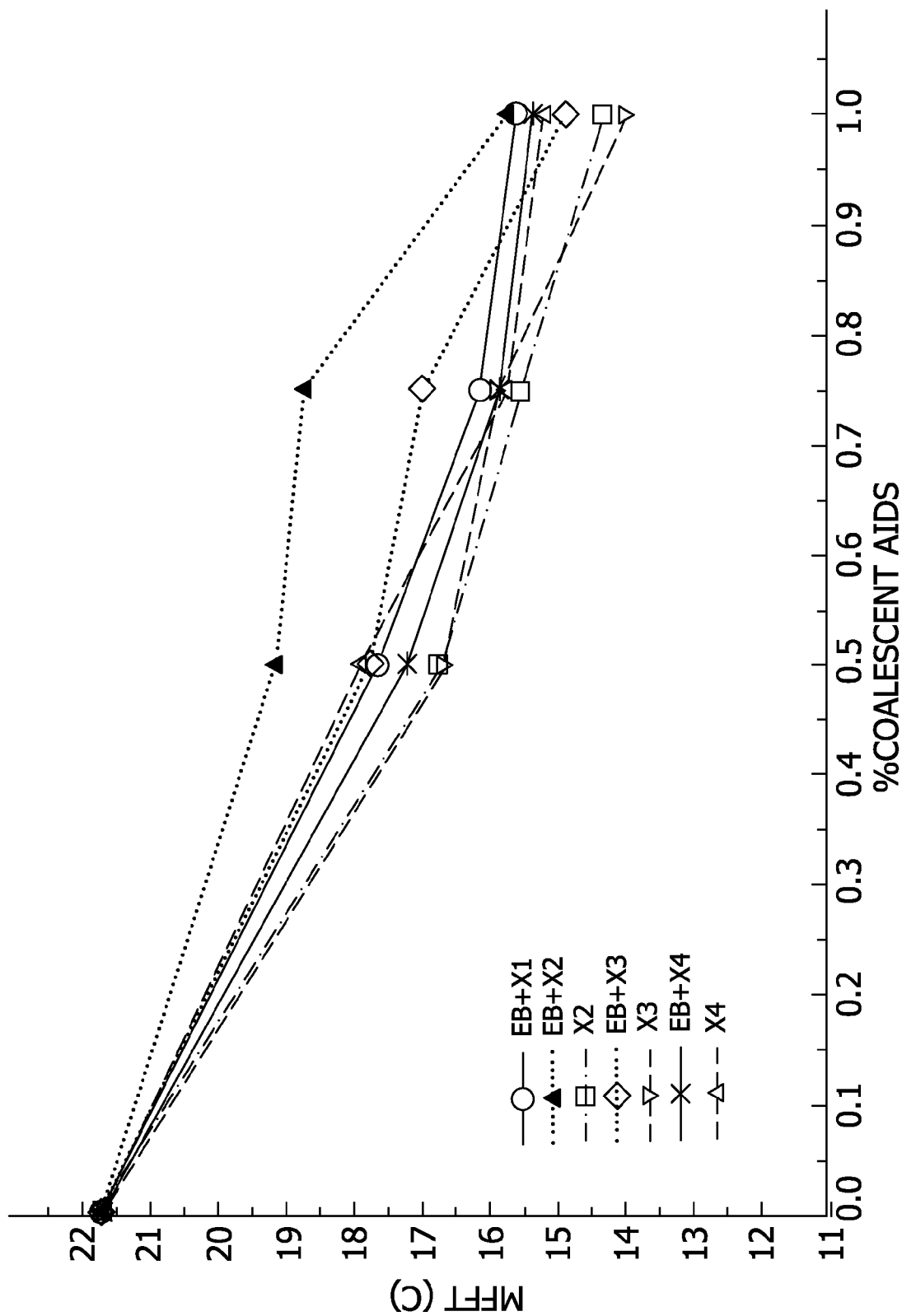
FIG. 9 is the MFFT plot for ACRONAL A846 as a function of coalescent aids.

The results from the MFFT measurements of high Tg resin (UCAR 430, PS/PMMA) formulation are shown in FIGS. 6 and 7. As FIGS. 6 and 7 illustrate, it was found that glycol fatty acid ester and glycol soy oil ester could lower the minimum film formation temperature better than ethylene glycol monobutyl ether (EB). This may be due to the slow evaporation rates of the glycol fatty acid ester and glycol soy oil ester relative to ethylene glycol monobutyl ether. Thus the coalescent new aids may stay in the system long enough to function in lowering the minimum film formation temperature. As shown in FIG. 7, all glycol soy oil esters could reduce the minimum film formation temperature in the same fashion as commercial coalescent aid, TEXANOL®.

Some of glycol fatty acid esters, i.e. methyl soyate, ethylene glycol oleate and ethylene glycol linoleate, could lower the minimum film formation temperature better than TEXANOL®. Methyl soyate ester could lower the MFFT the best.

ACRONAL A846

The MFFT results of high Tg resin (ACRONAL A846, pure acrylic resin) formulation, it was found that all glycol fatty acid ester and glycol soy oil esters could lower the minimum film formation temperature better than ethylene glycol monobutyl ether (EB). They also could reduce the minimum film formation temperature in the same manner as commercial coalescent aid, TEXANOL®. None of them could lower the minimum film formation temperature better than TEXANOL® except ethylene glycol soy oil ester at concentration of 1.0% by weight.

Example 6

AC Impedence measurements were taken to obtain the trend of the coating capacitance and coating resistance values as a function of dry time to express the film formation of latex coating as a function of dry time. In addition, the measurements with various coalescent aid formulations would also impact the effect of coalescent aid in latex film formation.

AC Impedence measurements were taken on 0.5% EB as a function of dry time, 0.5% TEXANOL® as a function of dry time, and 0.5% ethylene glycol soy oil ester as a function of dry time. A two-time constant equivalent circuit model, as a hypothetical equivalent circuit for the coated aluminum system, was used to correlate the Bolt and Nyquist result plots from the AC Impedence measurements. The coating resistance, coating capacitance, charge transfer resistance, and associated double layer capacitance obtained were plotted as a function of dry time. As FIG. 10 illustrates, the coating resistance increased as a function of dry time until approximately 8 hours dry time, then it leveled off. For the charge transfer resistance, there was a slight increase in the resistance which was not significant. This was because there was no corrosion taking place.

The coating capacitance plot (shown in FIG. 11) exhibited a decreasing trend as a function of dry time until approximately 8 hours then the capacitance was constant. This trend can be explained by the phenomenon that at shorter drying periods, the coating film was not completely coalesced, and there remained pores and the diffusion of electrolyte solution through the film could take place which resulted in the increase in film capacitance. For the longer drying periods the film was more coalesced and less diffusion took place. Therefore, the resistance of film is higher and the capacitance was lower as a function of longer dry periods.

As FIGS. 10 and 11 illustrate, the AC Impedance measurements showed an increase in coating resistance and a decrease in coating capacitance as well as the formulation with the conventional coalescent aid, TEXANOL®. This supported the contention that soybean oil coalescent aid effected latex film formation as well as TEXANOL®.

Example 7

Various IR and NMR spectra were taken of glycol soybean oil ester derivatives, methyl soybean oil derivatives, and ethylene glycol fatty acid derivatives.

IR-Spectra

Figure 12:
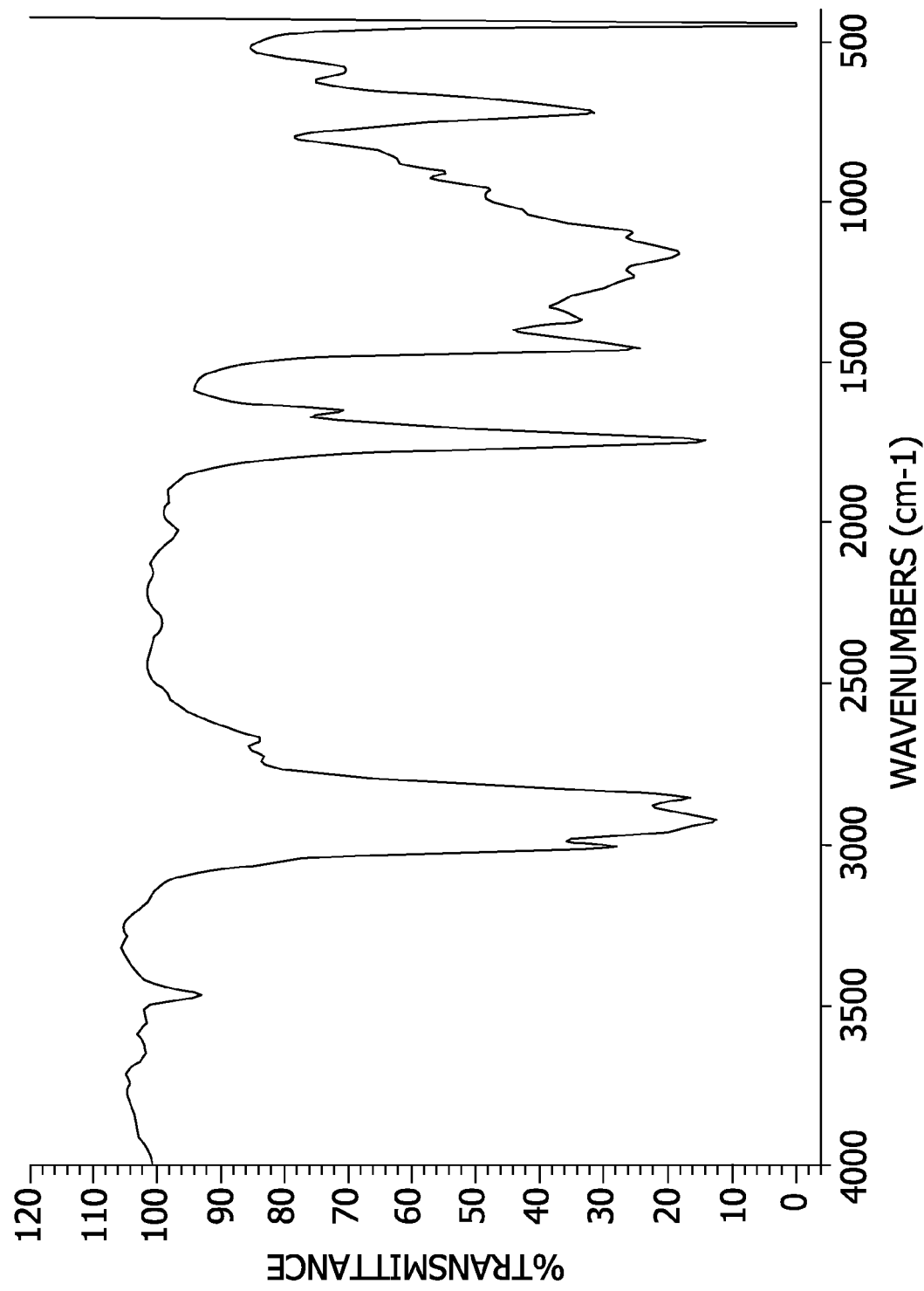
Figure 13:
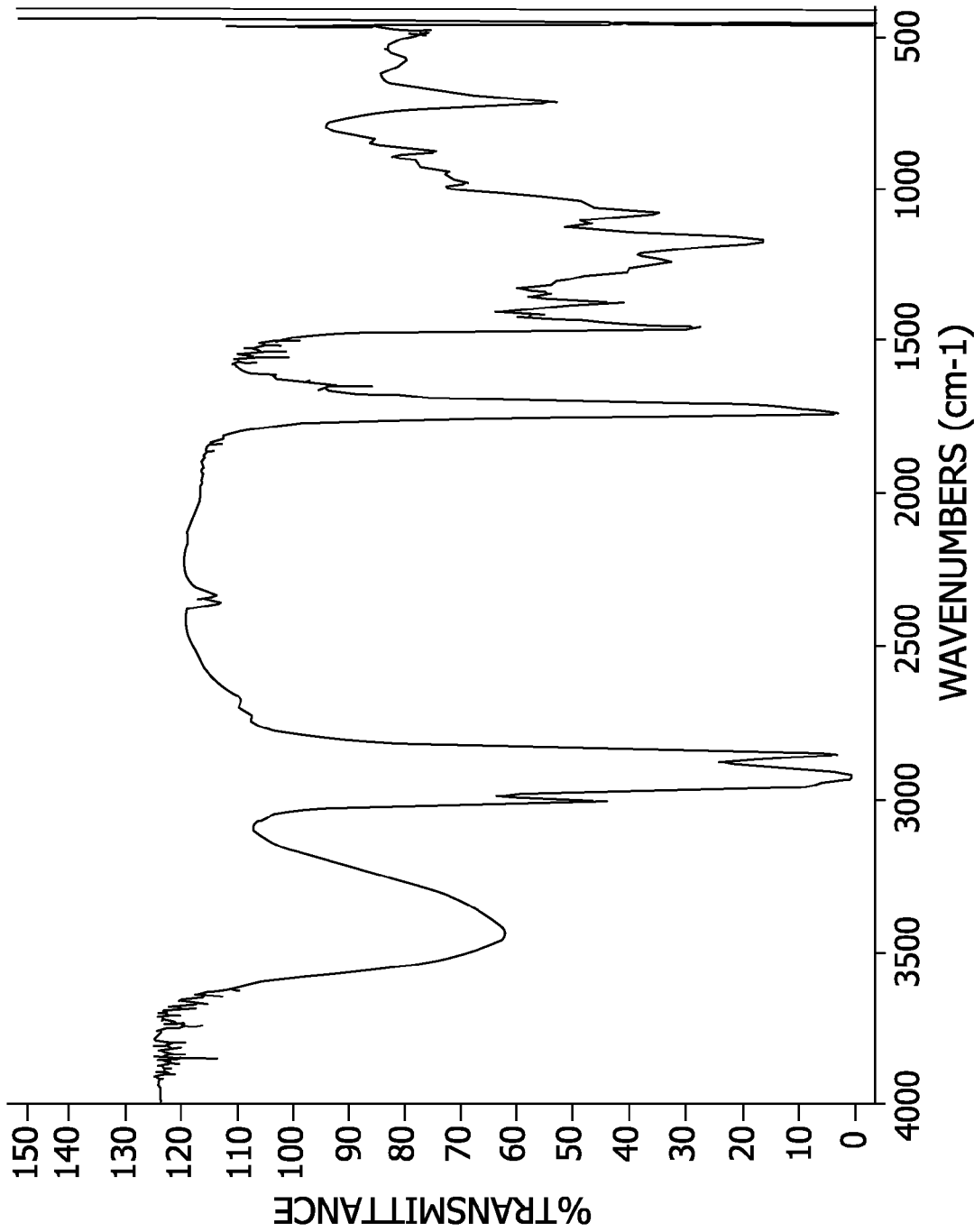
Figure 14:
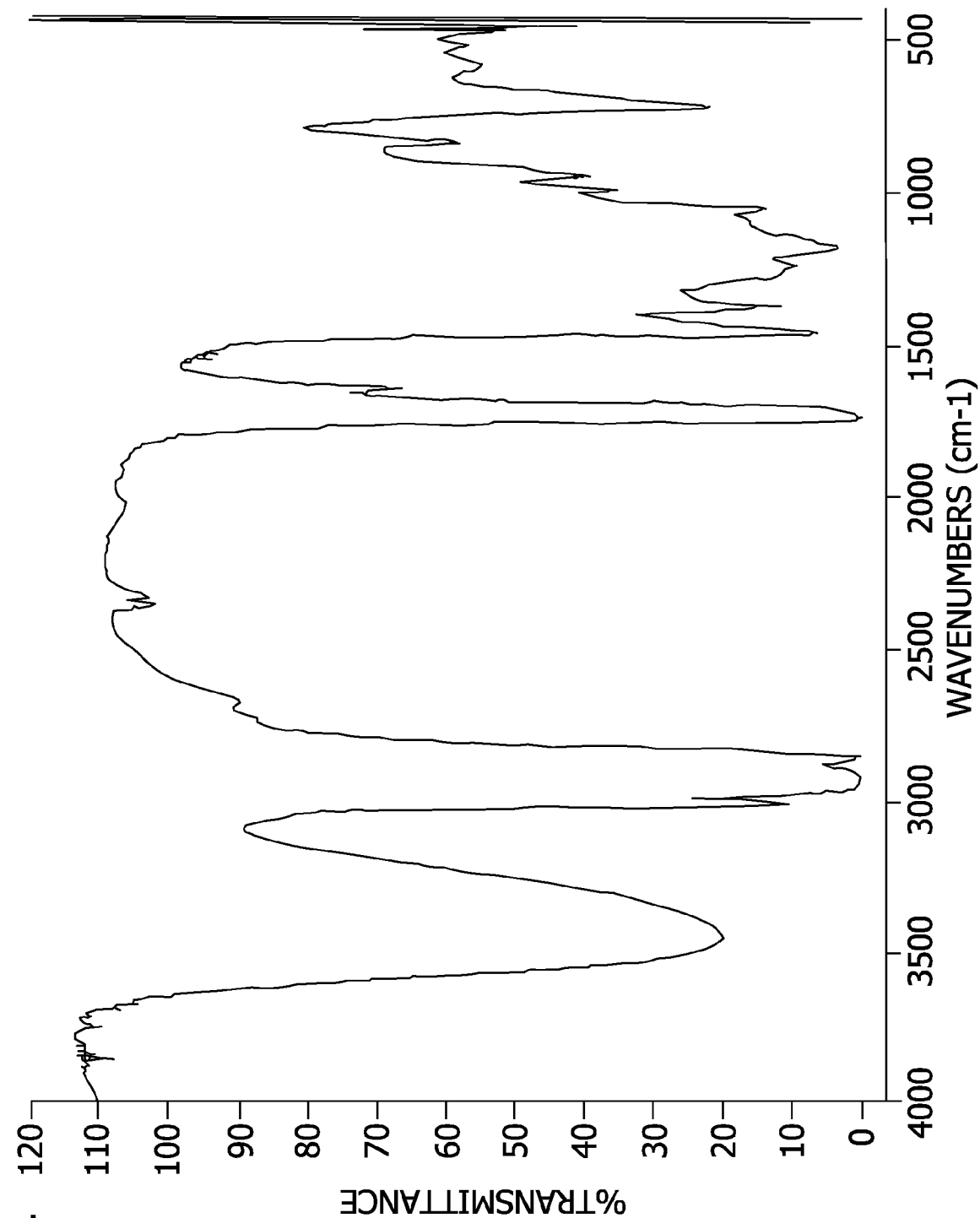
Figure 15:
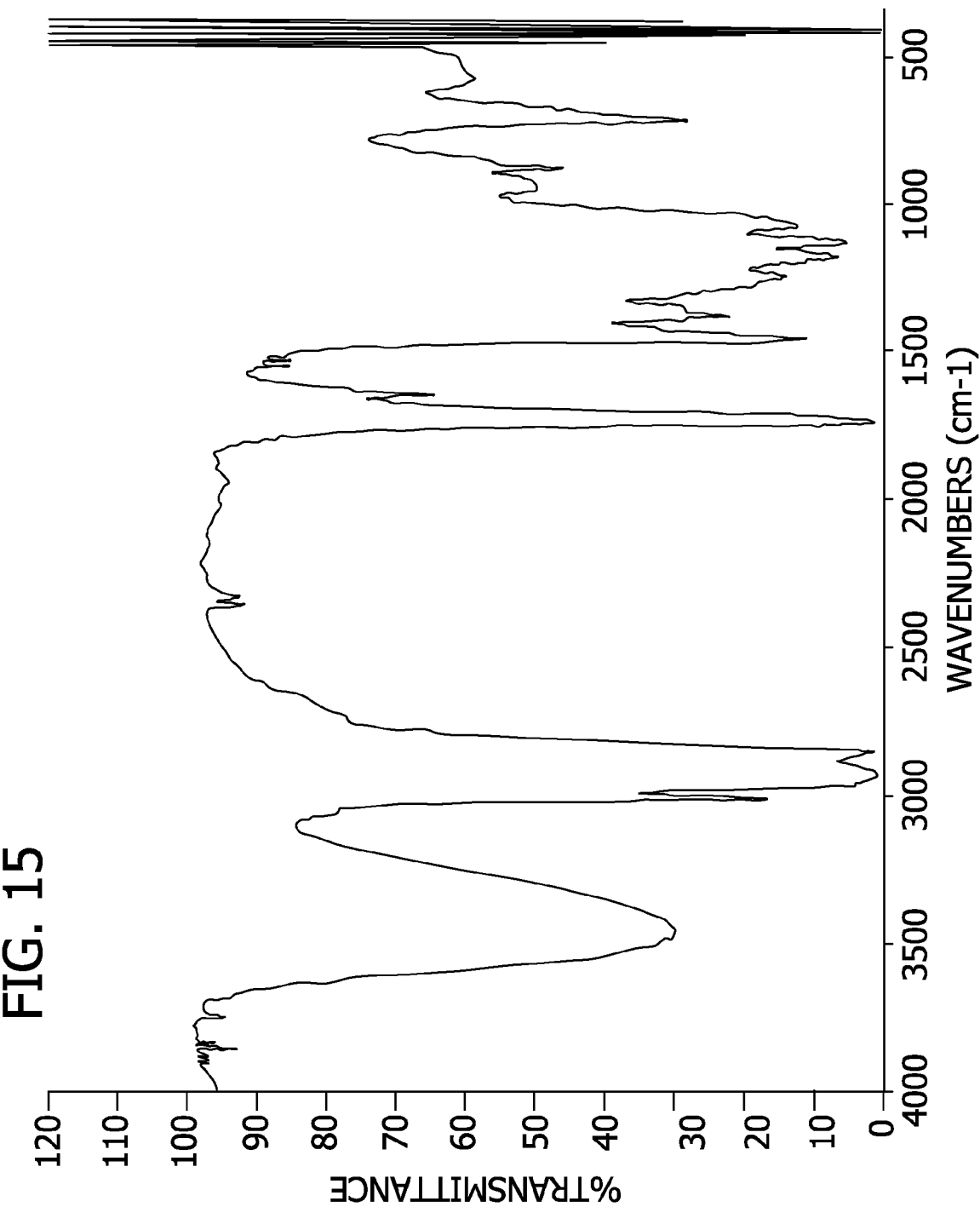
Figure 16:
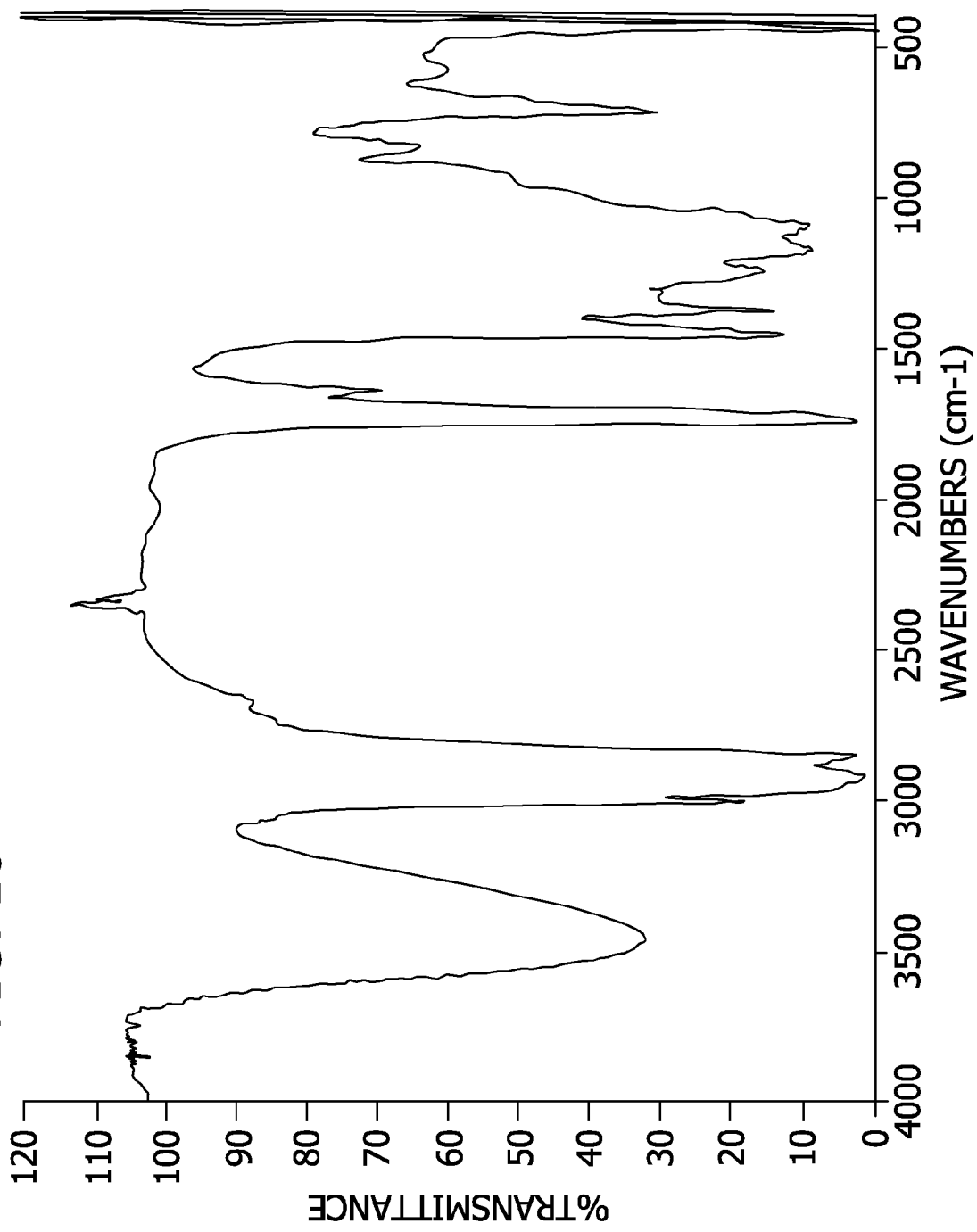
Figure 17:
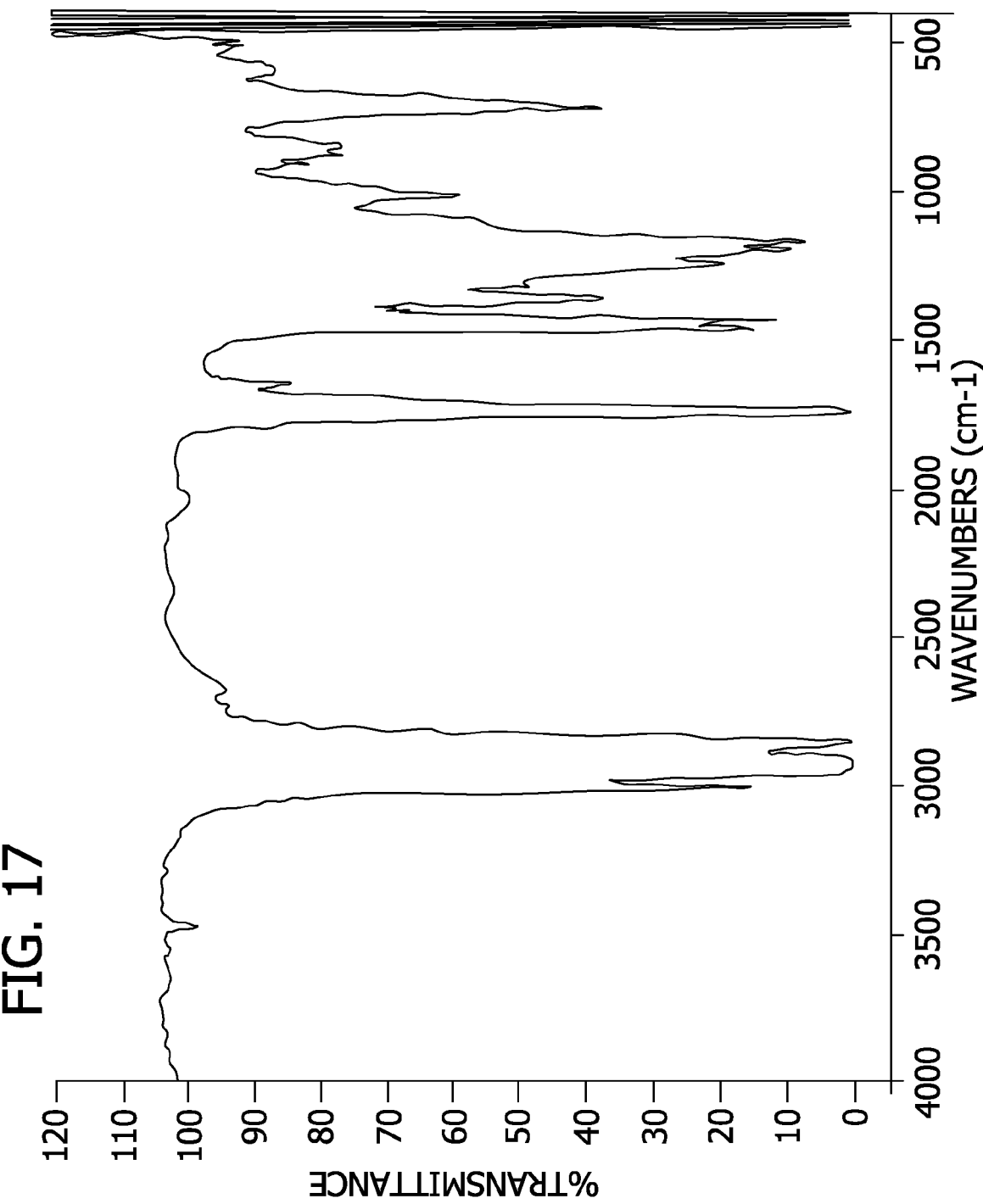
Figure 18:
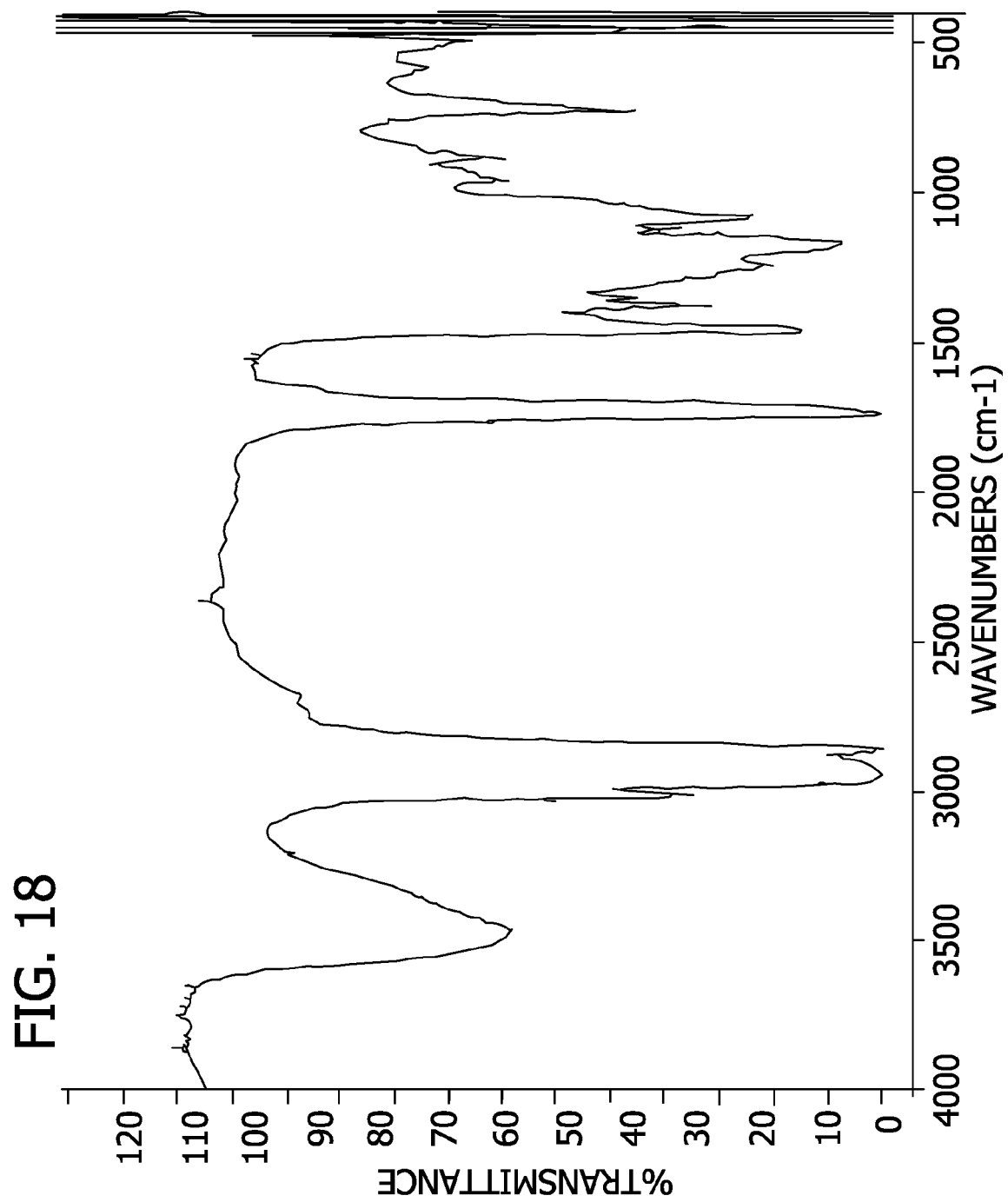
Figure 19:
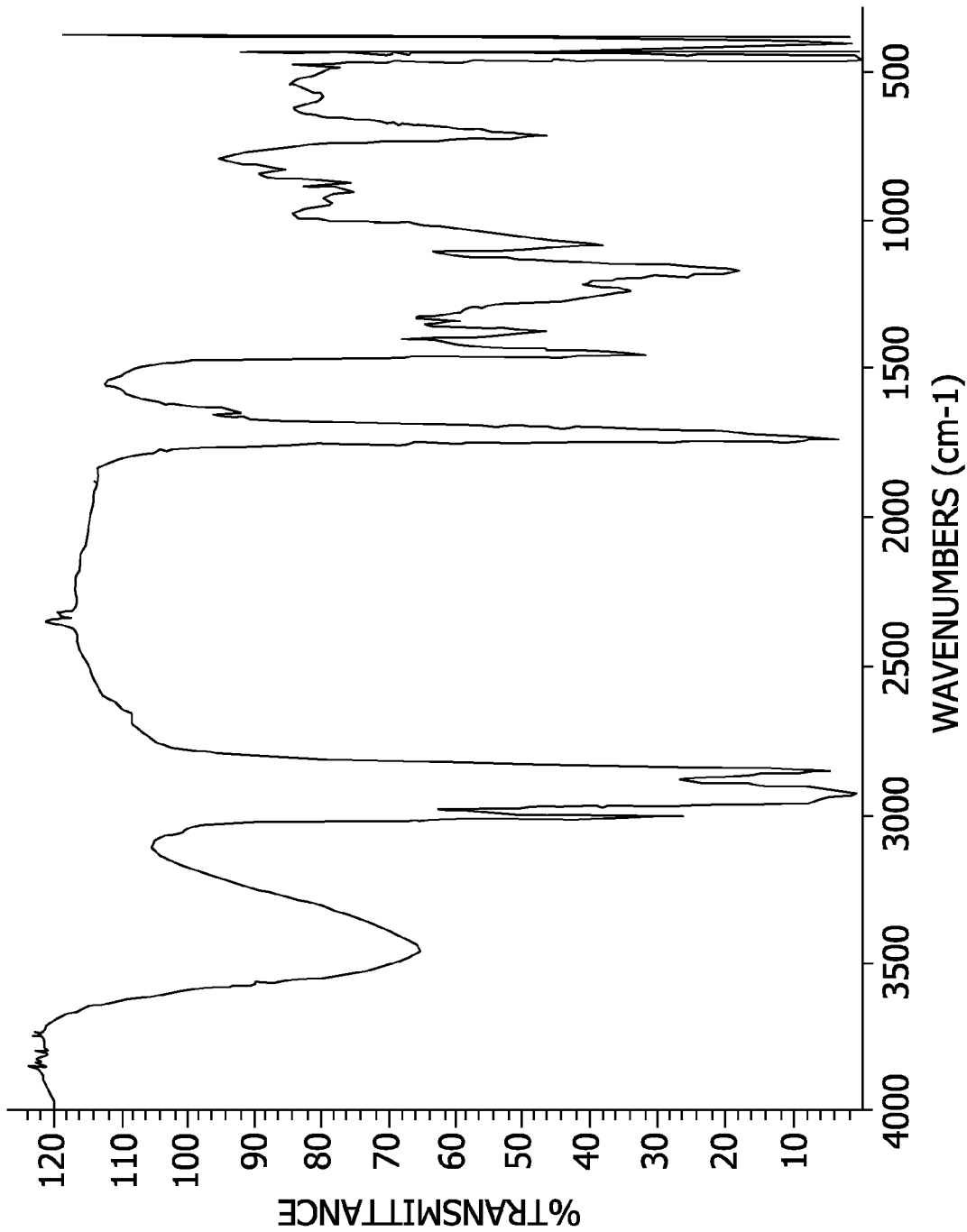

Infrared spectra of soybean oil and soybean oil ester derivatives are shown in FIGS. 12-19. FIG. 12 shows the IR spectrum of soybean oil. FIGS. 13-17 show the IR spectra of the soybean oil ester derivatives of ethylene glycol (FIG. 13), propylene glycol (FIG. 14), diethylene glycol (FIG. 15), dipropylene glycol (FIG. 16) and the methyl soybean oil ester derivative (FIG. 17). FIG. 18 shows the IR spectrum of the ethylene glycol oleate ester derivative and FIG. 19 shows the IR spectrum of the ethylene glycol linoleate ester derivative.

Figure 20:
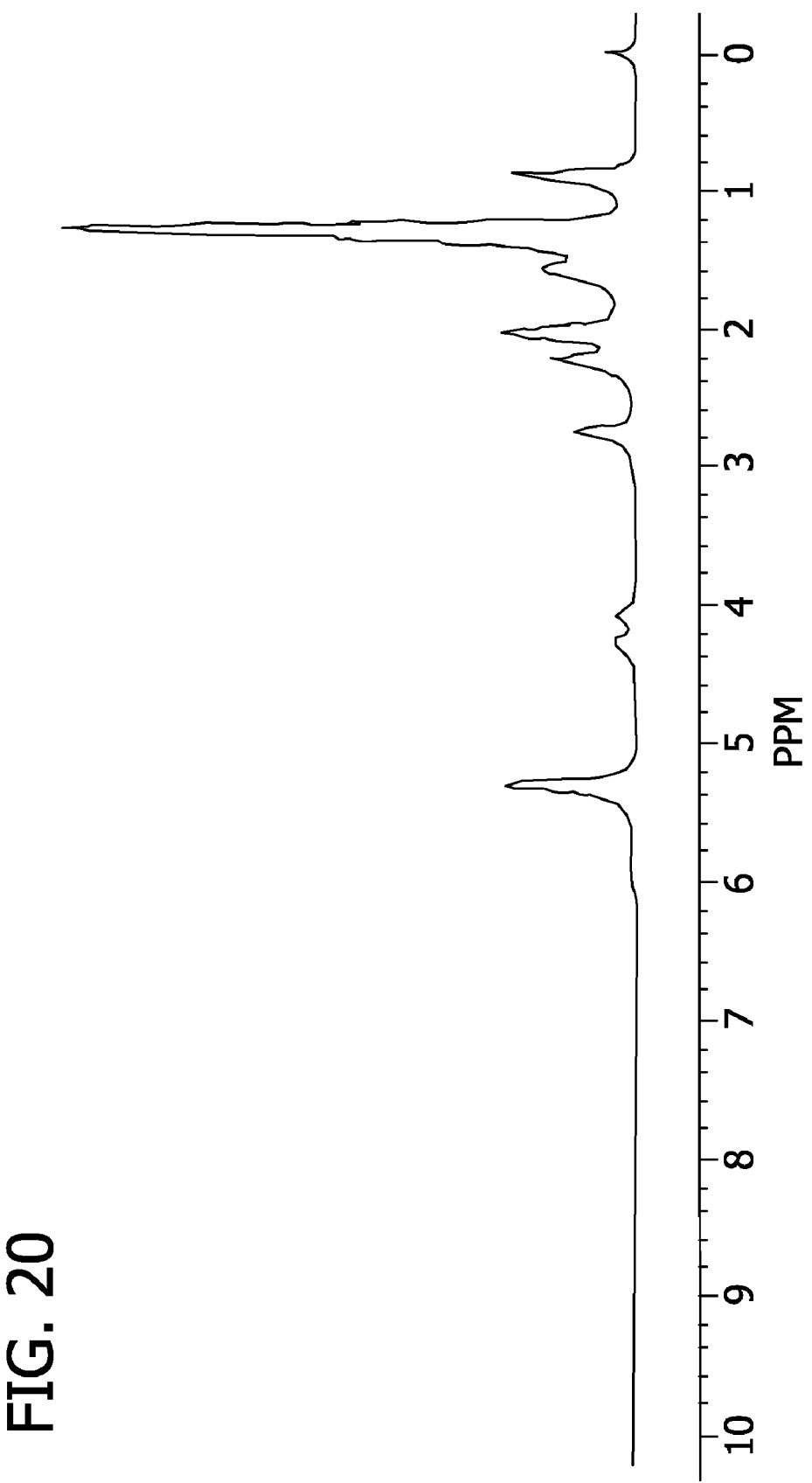
Figure 21:
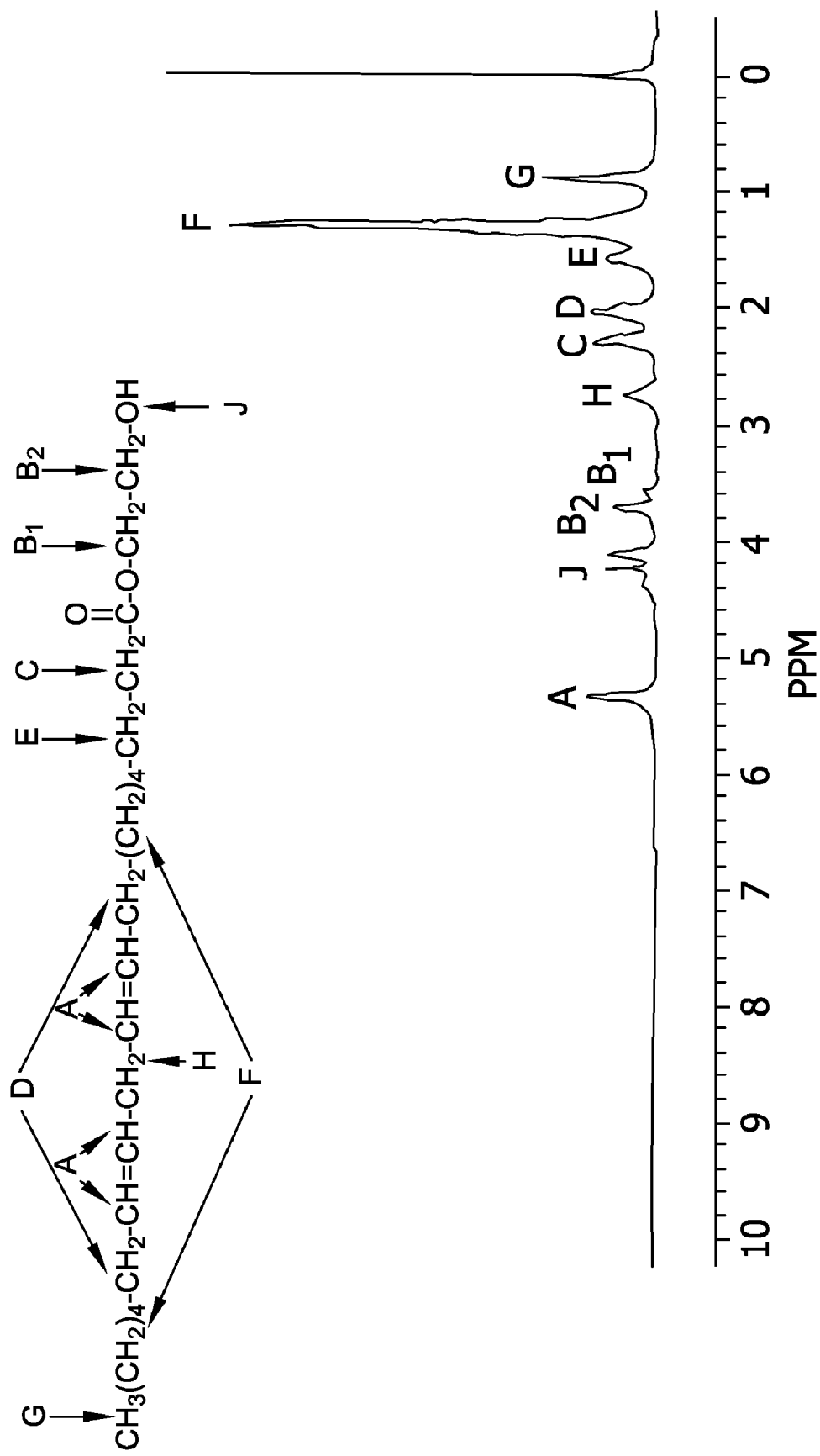
Figure 22:
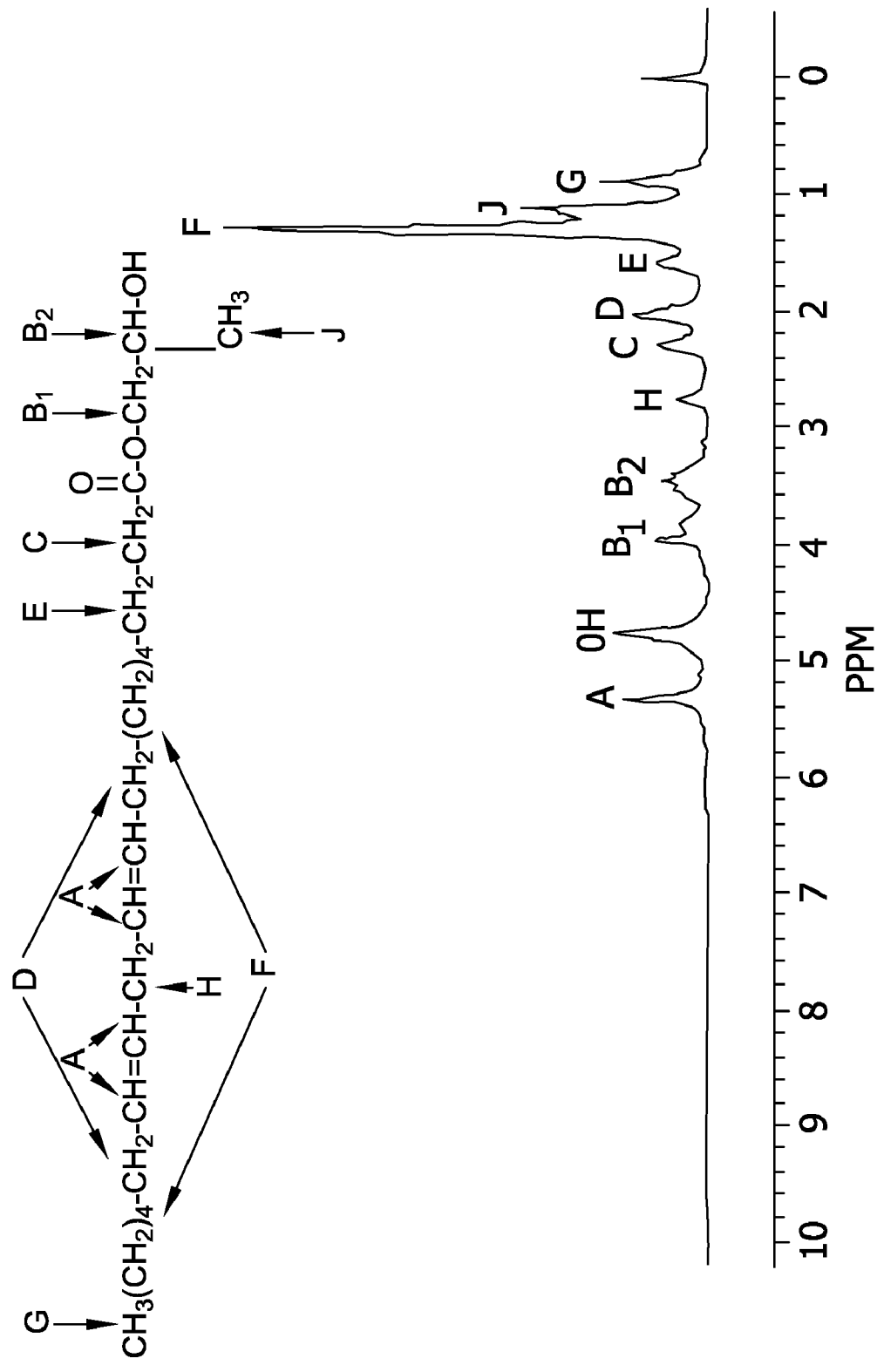
Figure 23:
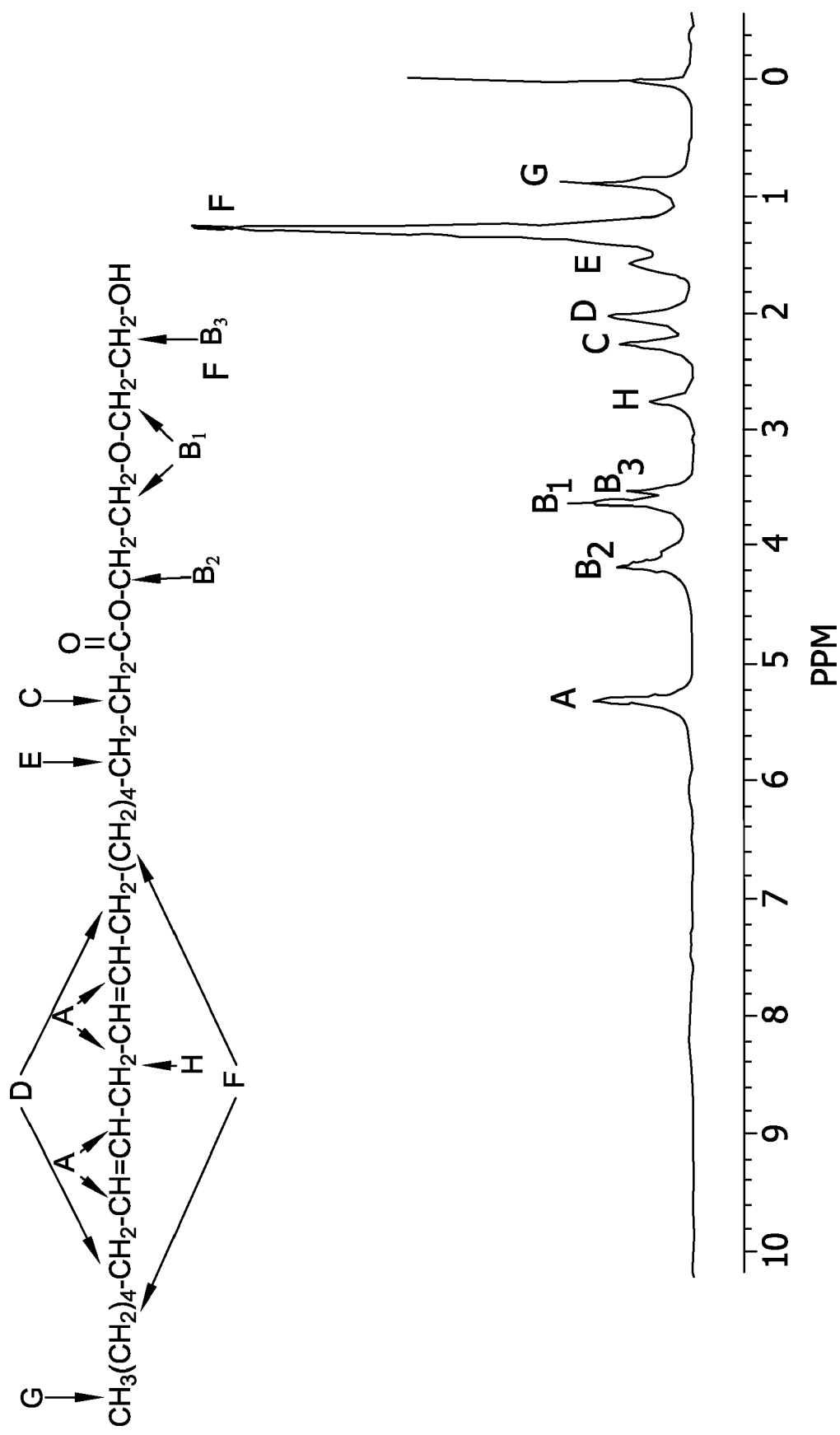
Figure 24:
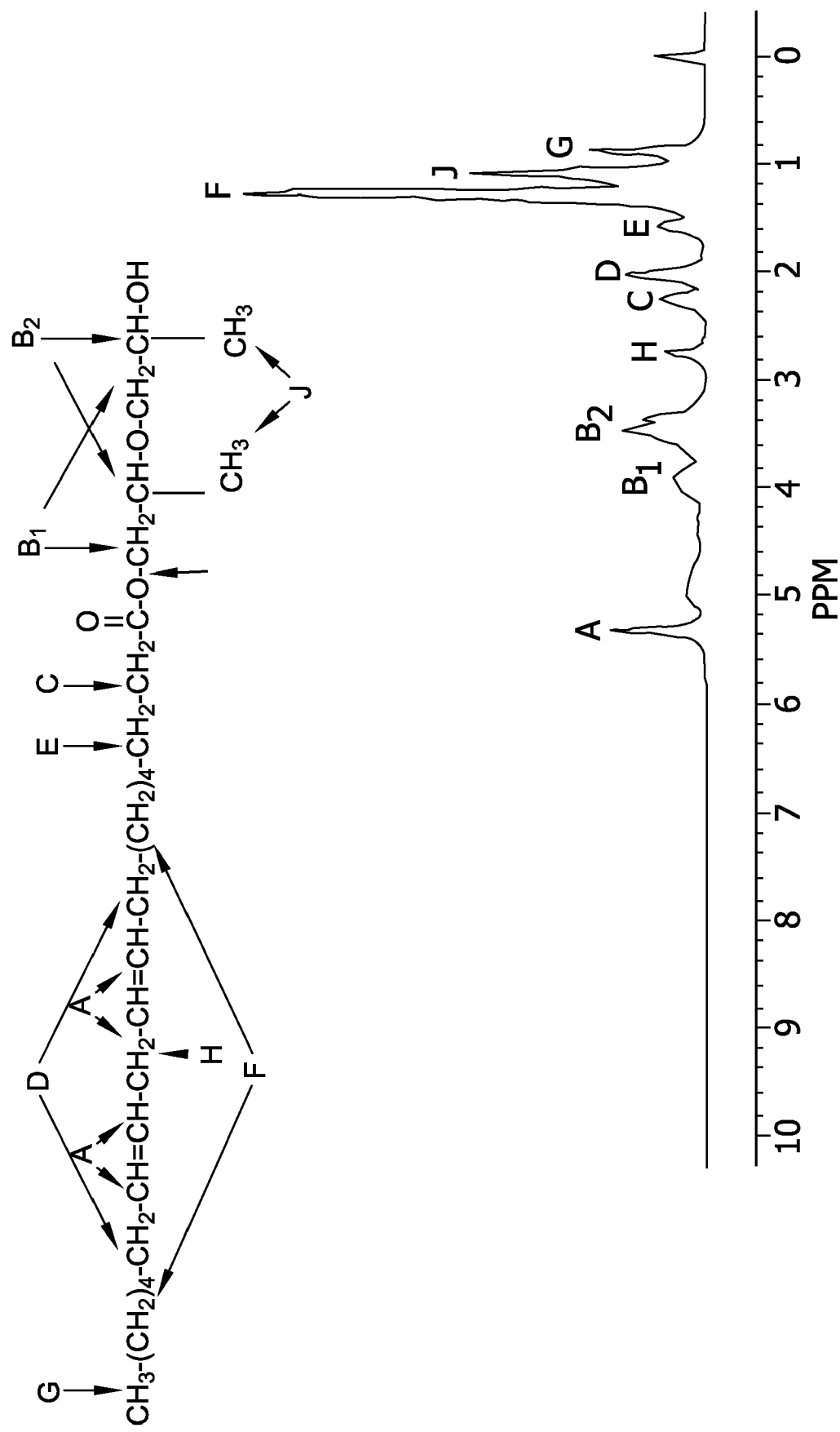
Figure 25:
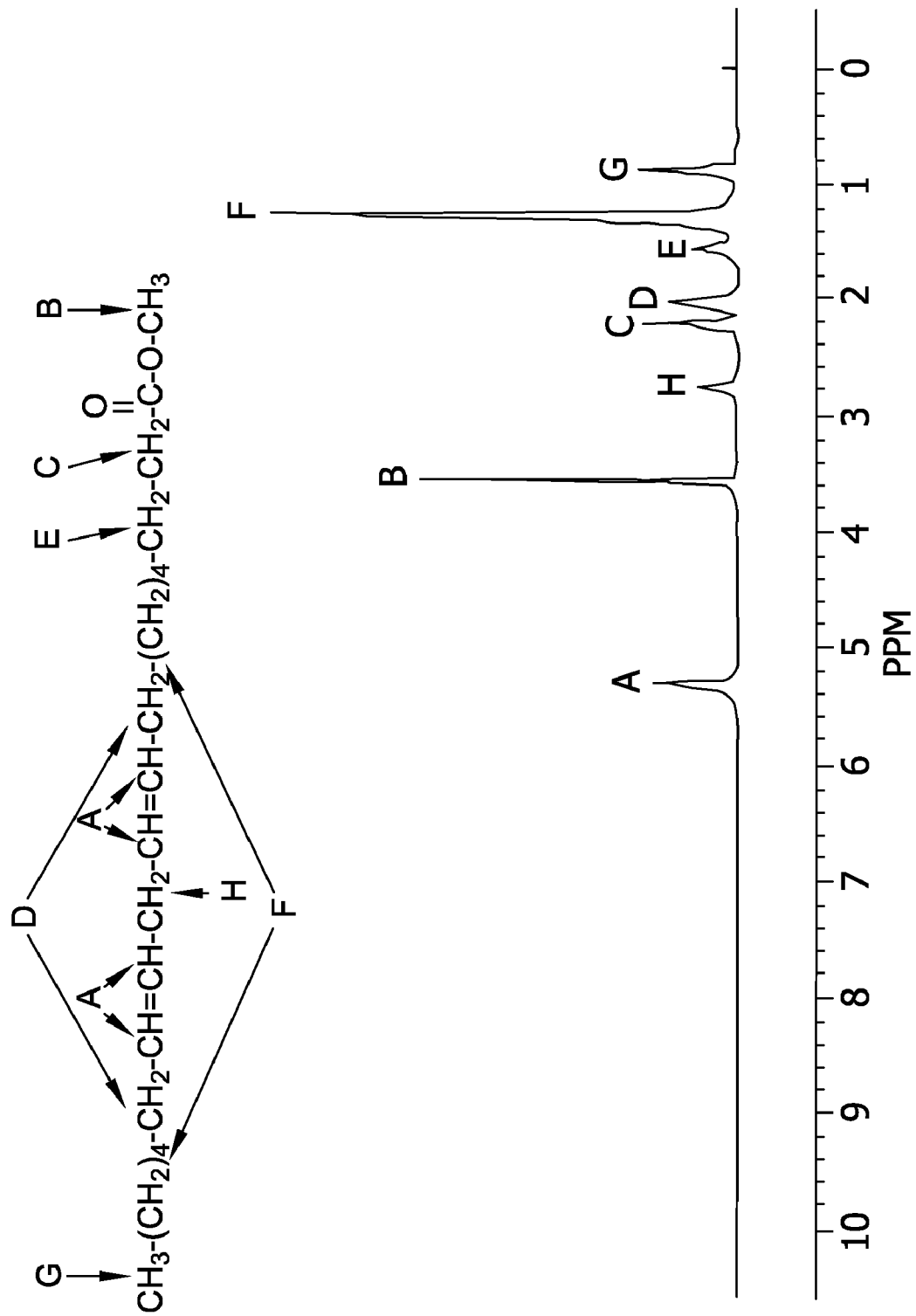
Figure 26:
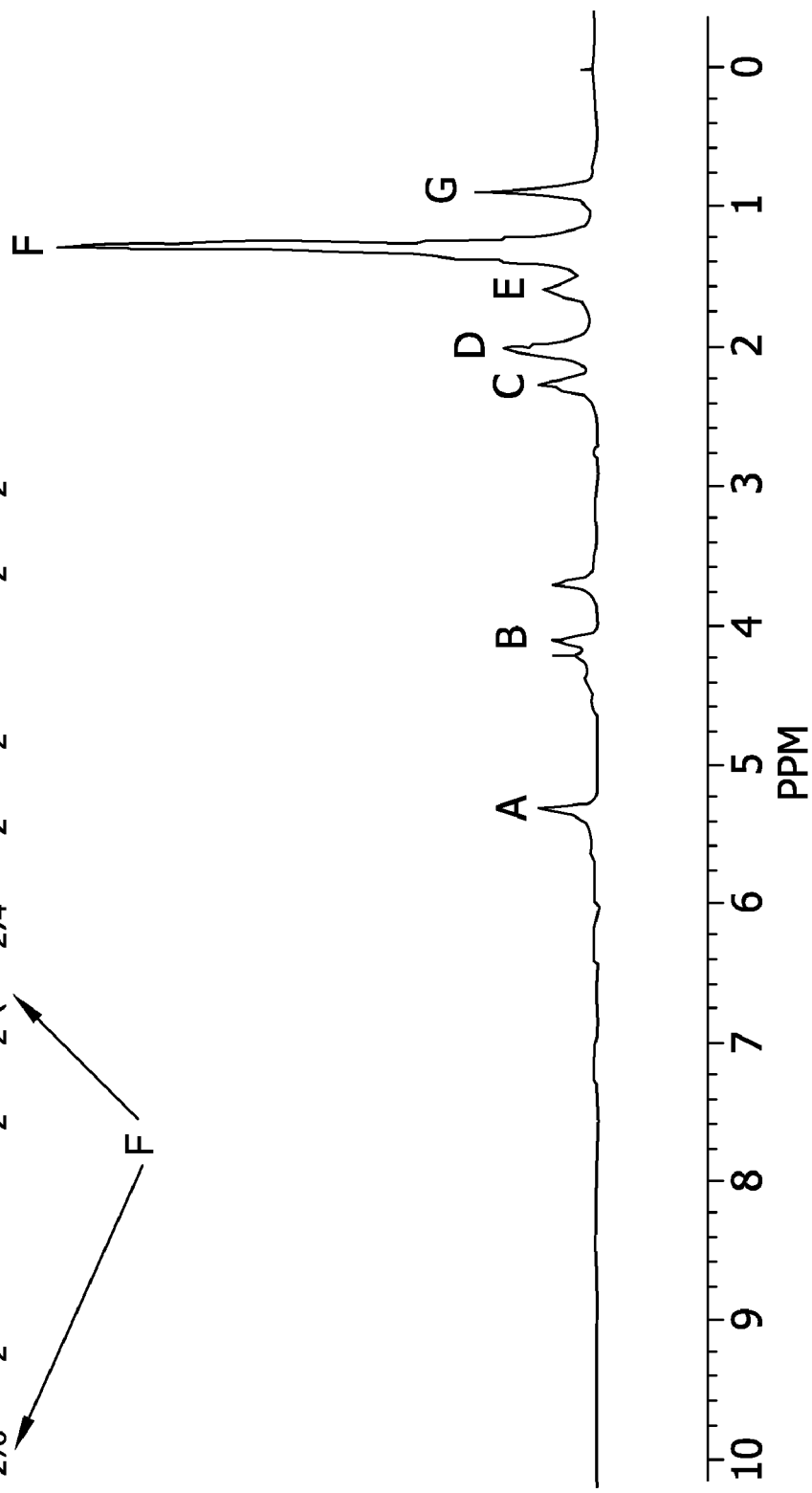
Figure 27:
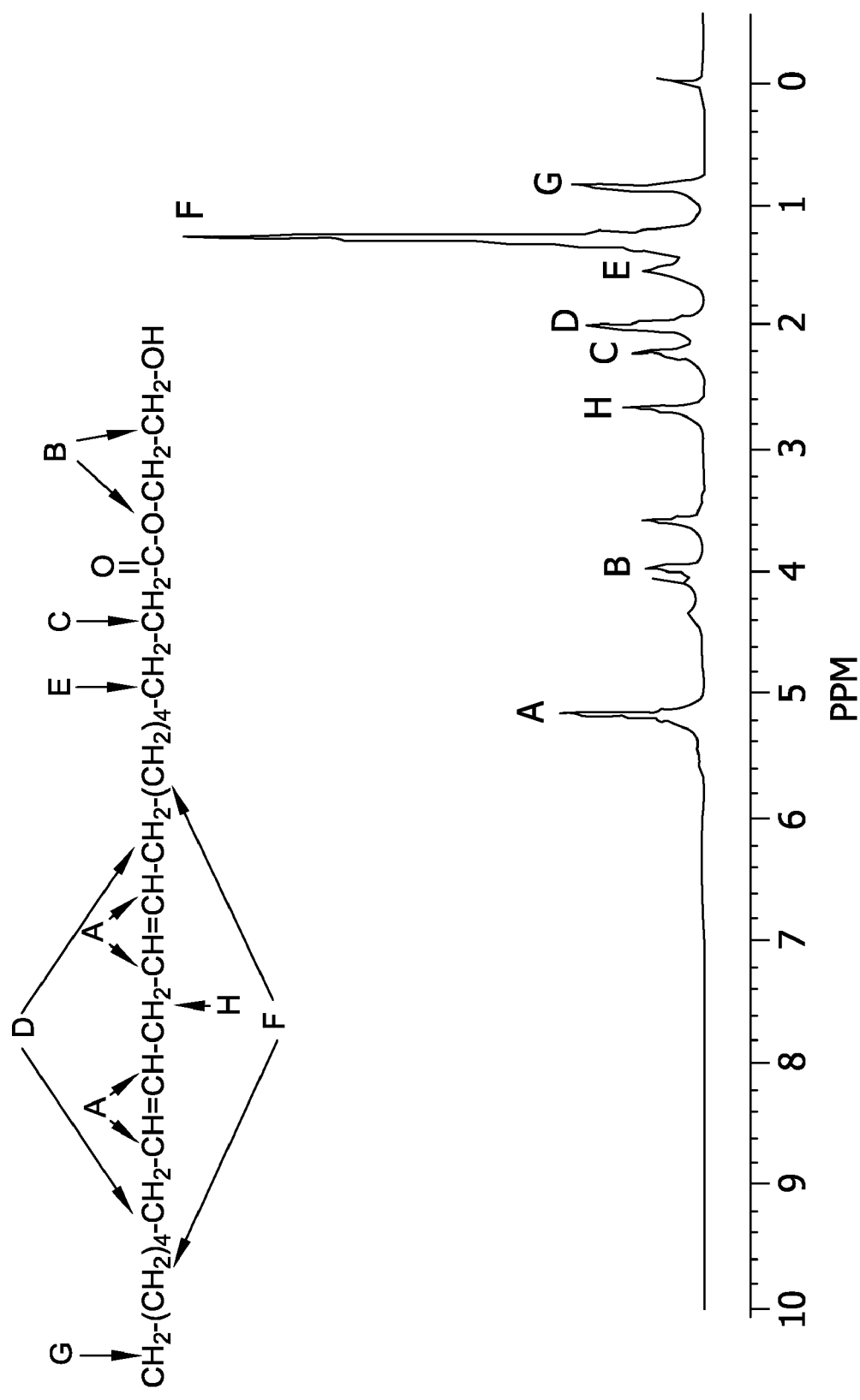

$^1$H-NMR DATA $^1$H-NMR spectra were obtained for soybean oil and soybean oil ester derivatives. FIG. 20 shows the $^1$H-NMR spectrum of soybean oil. FIGS. 21-25 show the $^1$H-NMR spectra of the soybean oil ester derivatives of ethylene glycol (FIG. 21), propylene glycol (FIG. 22), diethylene glycol (FIG. 23), dipropylene glycol (FIG. 24) and the methyl soybean oil ester derivative (FIG. 25). The $^1$H-NMR spectrum of the ethylene glycol oleate ester derivative is shown in FIG. 26, and FIG. 27 shows the $^1$H-NMR spectrum of the ethylene glycol linoleate ester derivative.

Figure 28:
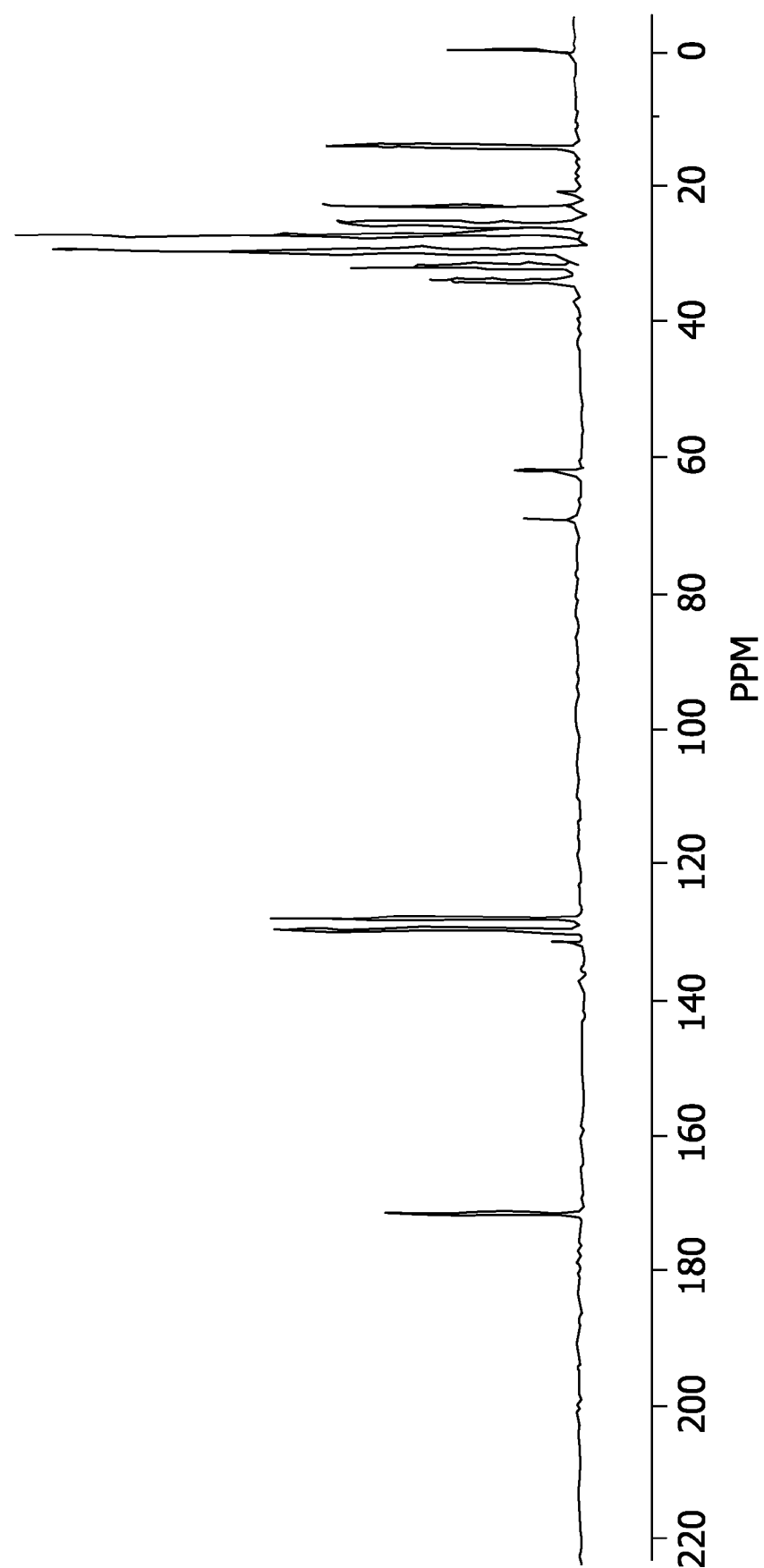
Figure 29:
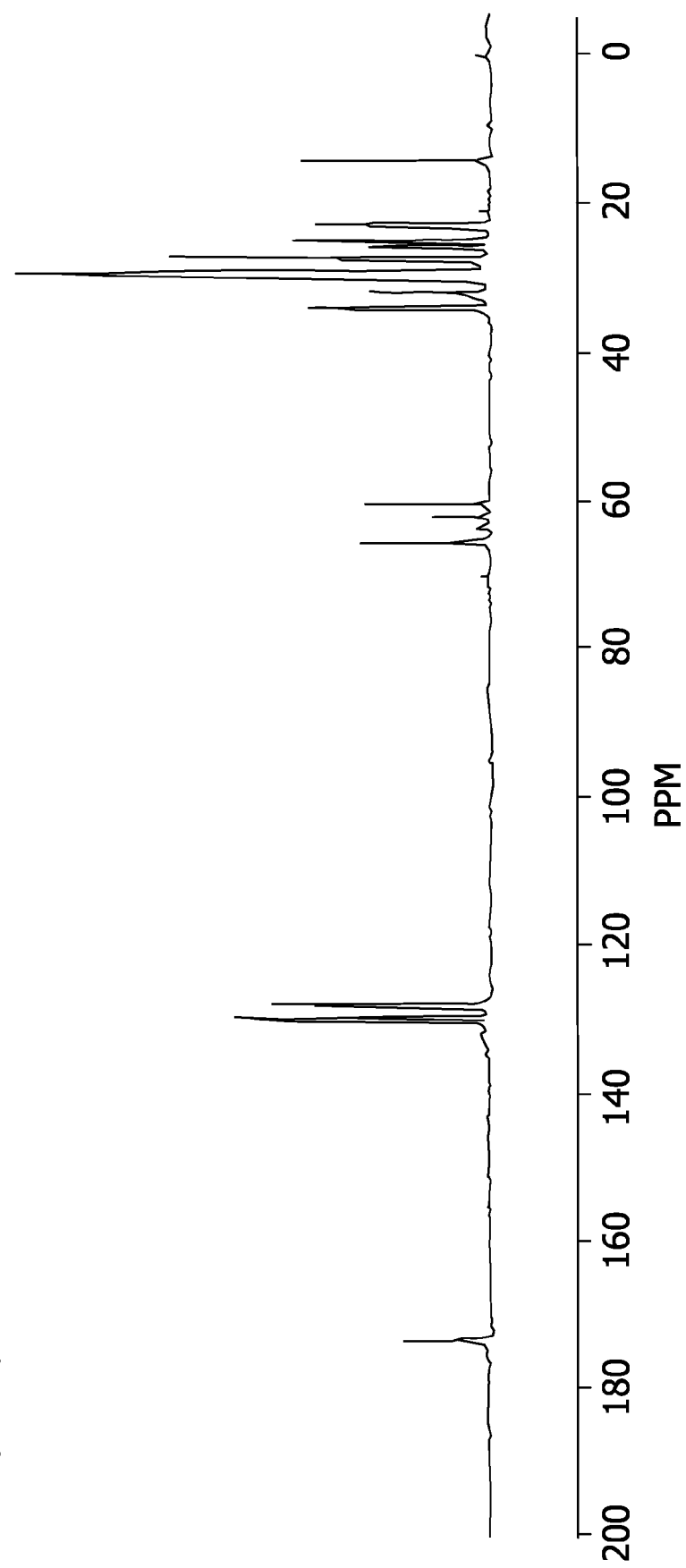
Figure 30:
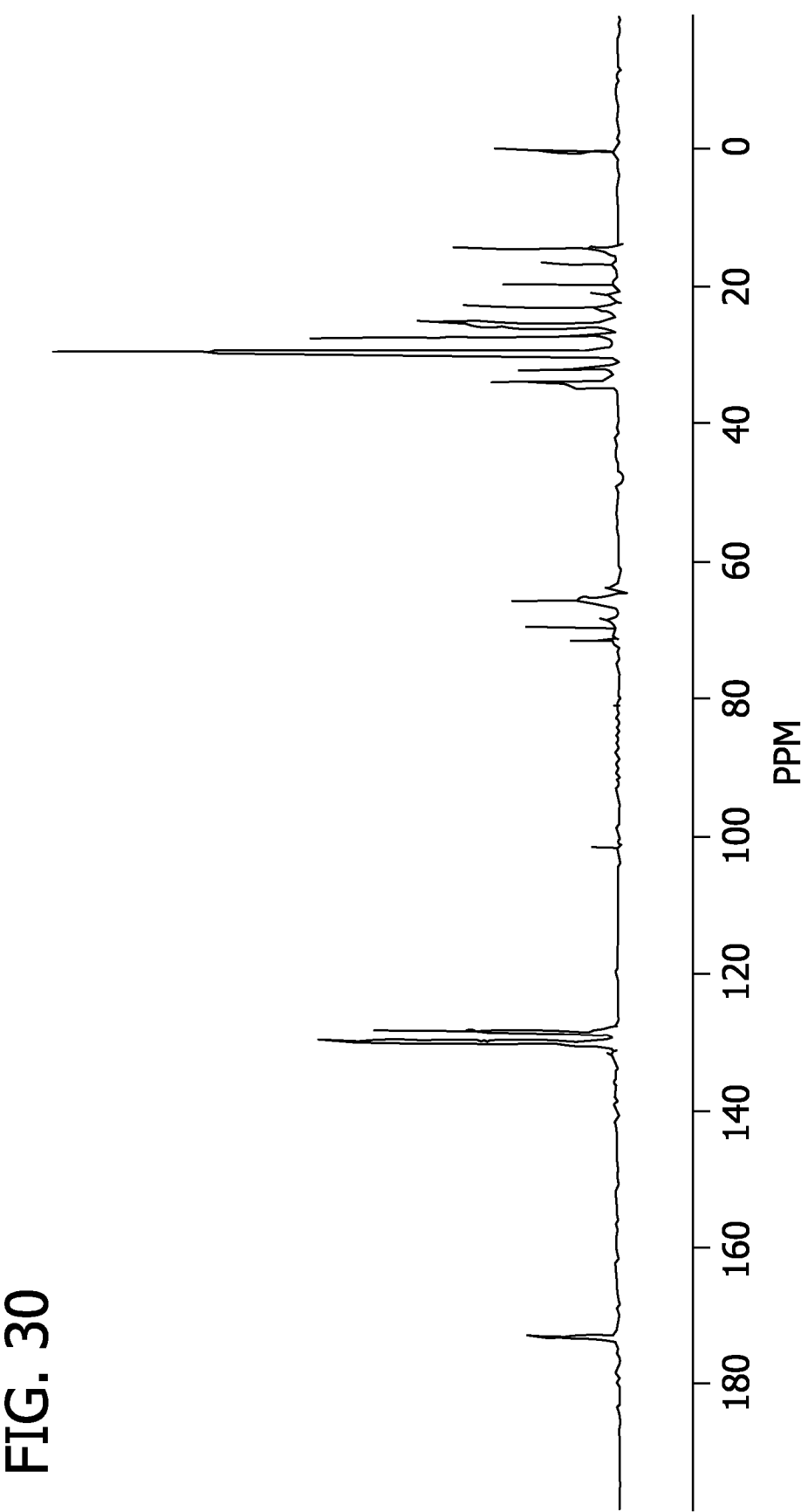
Figure 31:
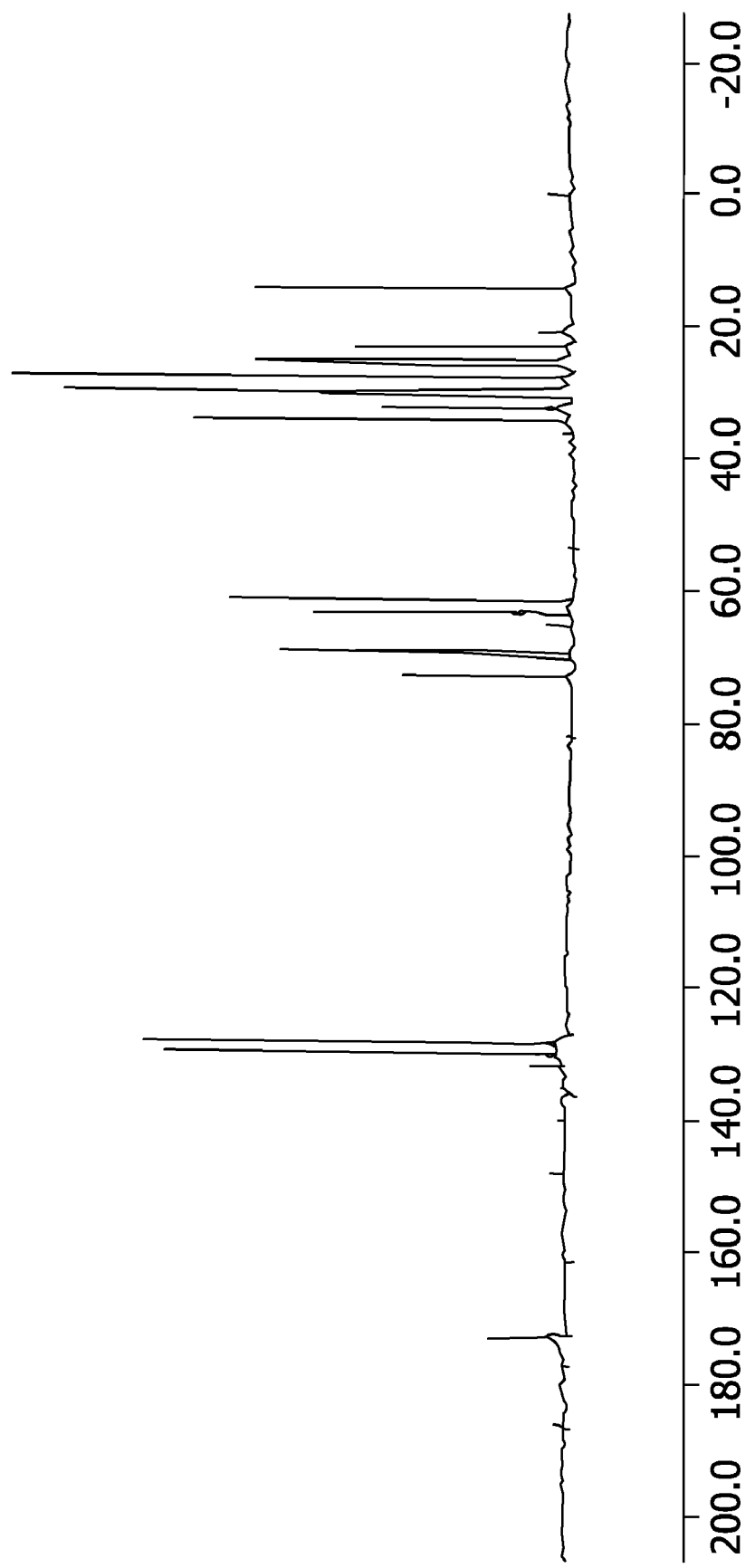
Figure 32:
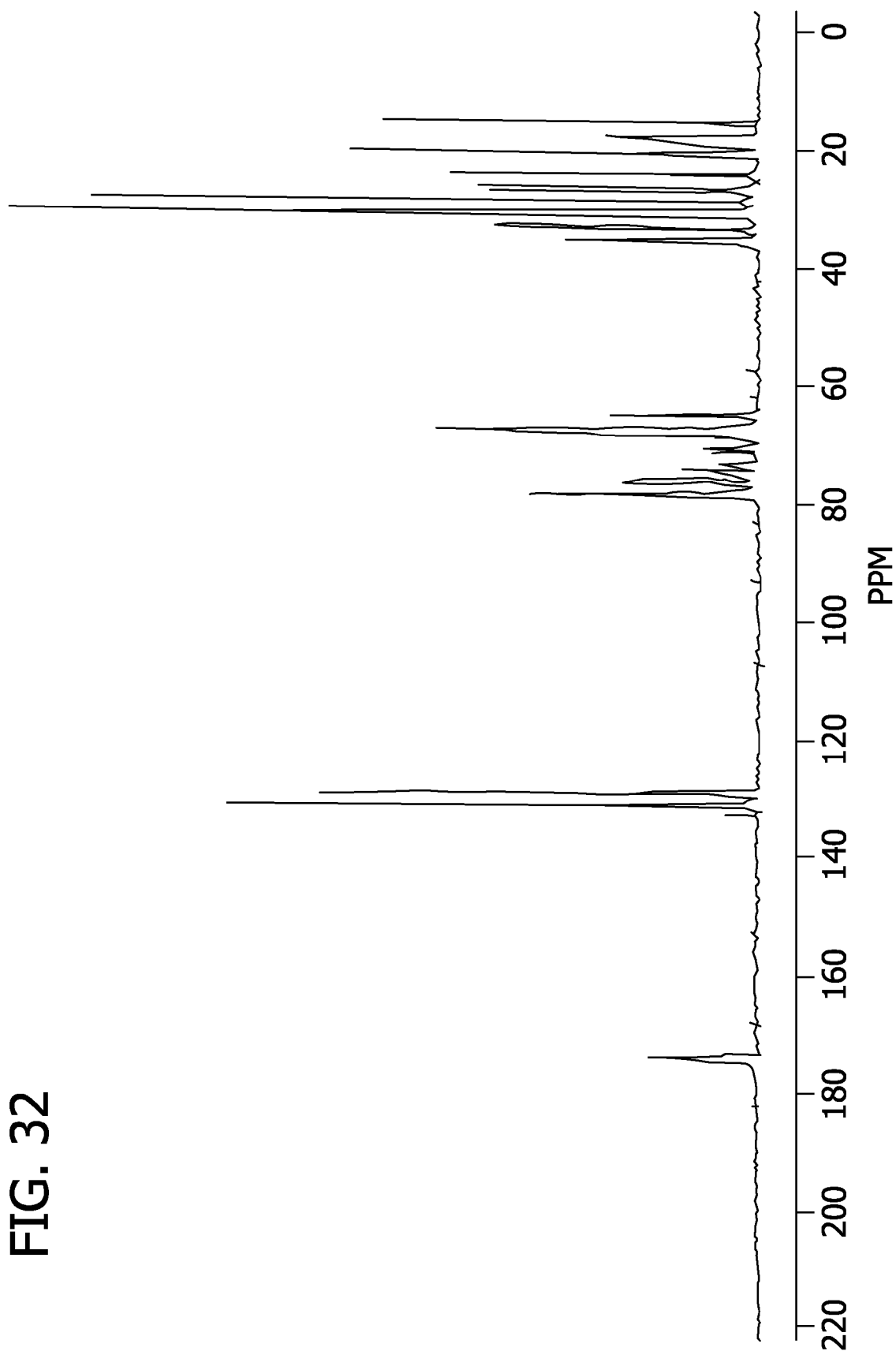

$^{13}$C-NMR DATA $^{13}$C-NMR DATA spectra were obtained for soybean oil and soybean oil ester derivatives. FIG. 28 shows the $^{13}$C-NMR DATA spectrum of soybean oil. FIGS. 29-32 show the $^{13}$C-NMR DATA spectra of the soybean oil ester derivatives of ethylene glycol (FIG. 29), propylene glycol (FIG. 30), diethylene glycol (FIG. 31), and dipropylene glycol (FIG. 32).

Example 8

Physical properties such as solubility parameters, Hydrophilic Lipophilic Balance values (HLB values), density, and surface tension were measured of various soybean oil esters, ethylene glycol monobutyl ether (EB), and TEXANOL®. The soybean oil esters included ethylene glycol soybean oil derivative, diethylene glycol soybean oil derivative, propylene glycol soybean oil derivative, dipropylene glycol soybean oil derivative, and methyl ester soybean oil derivative.

| | Soy oil derivative esters | | | | | | |
|---|---|---|---|---|---|---|---|
| | EG[a] | DEG[b] | PG[c] | DPG[d] | ME[e] | EB[f] | TEXANOL®[g] |
| Properties | | | | | | | |
| Density (g/cm$^3$) | 0.94 | 0.93 | 0.91 | 0.91 | 0.87 | | |
| HLB | 2.7 | 4.8 | 3.4 | 5.9 | N/A | 14.9 | N/A |
| Interfacial tension (dyne/cm) | 36.2 | 36.1 | 33.3 | 35.7 | 30.1 | 27.4 | 28.9 |
| Solubility Parameters | | | | | | | |
| $\delta_{total}$ (J/cm$^3$)$^{1/2}$ | 18.6 | 18.2 | 18.0 | 17.6 | 17.9 | 20.7 | 19.3 |
| $\delta_d$ (J/cm$^3$)$^{1/2}$ | 16.2 | 15.8 | 15.7 | 15.4 | 17.2 | 15.9 | 15.6 |
| $\delta_p$ (J/cm$^3$)$^{1/2}$ | 2.03 | 2.04 | 1.88 | 1.85 | 1.50 | 4.9 | 3.07 |
| $\delta_h$ (J/cm$^3$)$^{1/2}$ | 8.8 | 8.7 | 8.5 | 8.3 | 4.6 | 12.3 | 10.9 |

[a] Ethylene glycol soybean oil derivative (EG)
[b] Diethylene glycol soybean oil derivative (DEG)
[c] Propylene glycol soybean oil derivative (PG)
[d] Dipropylene glycol soybean oil derivative (DPG)
[e] Methyl ester soybean oil derivative (ME)
[f] Ethylene glycol monobutyl ether (EB)
[g] TEXANOL®

From the solubility parameters shown in the table above, it was found that the total solubility parameter of EB is greater than TEXANOL® and the glycol soybean oil derivatives. In addition, the polar solubility parameter ($*_p$) and hydrogen bonding solubility parameter ($*_h$) decreased in the order of EB>TEXANOL®>glycol soybean oil derivatives. Therefore, EB would be able to be miscible with water better than TEXANOL® and glycol soybean oil derivatives.

The solubility parameter of a polymer, the polystyrene methyl methacrylate copolymer (PS-MMA, UCAR 430) was considered. The solubility parameter of PS-MMA is 18.2 (J/cm3)½ as stated in J. Brandrup and E. H. Immergut, *Polymer Handbook*, 2$^{nd}$ ed., Wiley-Interscience, New York, p 519 (1989). It was found that the solubility parameter of glycol soy oil esters and TEXANOL® were close to that of polystyrene rather than EB. Ideally for hydrophobic coalescent aids, a solubility parameter match will produce a better coalescent aid. As a result, TEXANOL® and glycol soybean oil derivatives should coalesce the polystyrene methyl methacrylate copolymer (UCAR 430) better than EB.

Higher HLB values correspond with greater miscibility with water. In the above table the HLB value of EB was greater than that of glycol soybean oil derivatives. This corresponded with the solubility parameter of EB. Therefore, EB would be miscible with water better than glycol soybean oil derivatives.

The value of the interfacial tension is a measure of the dissimilarity of the two types of molecules facing each other across the interface. The smaller the interfacial tension, the more similar in nature the two molecules are, and the greater the interaction between the molecules. In the table above the interfacial tension of EB was 27.4 dyne/cm which was less than those of TEXANOL® and glycol soybean oil esters. Therefore, EB would be miscible with water better than TEXANOL® and glycol soybean oil esters.

What is claimed is:

1. A film-forming composition comprising a continuous aqueous phase and a dispersed phase, the dispersed phase comprising (i) an emulsified liquid prepolymer, and (ii) a coalescent aid comprising an ester selected from the group consisting of the methyl, ethylene glycol, diethylene glycol, propylene glycol, and dipropylene glycol esters of a fatty acid of corn oil, sunflower oil, soybean oil, or linseed oil wherein the weight of the ester is (i) about 0.1% to about 4% of the weight of the liquid prepolymer and (ii) at least about 50% of the coalescent aid.

2. The film-forming composition of claim 1 wherein the coalescent aid comprises an ester selected from the group consisting of the ethylene glycol, diethylene glycol, propylene glycol, and dipropylene glycol esters of a fatty acid of corn oil, sunflower oil, soybean oil, or linseed oil.

3. The film-forming composition of claim 1 wherein the coalescent aid comprises an ester selected from the group consisting of the ethylene glycol, diethylene glycol, propylene glycol, and dipropylene glycol esters of a fatty acid of sunflower oil.

4. The film-forming composition of claim 1 wherein the coalescent aid comprises an ester selected from the group consisting of the ethylene glycol, diethylene glycol, propylene glycol, and dipropylene glycol esters of a fatty acid of soybean oil.

5. The film-forming composition of claim 1 wherein the coalescent aid comprises an ester selected from the group consisting of the ethylene glycol, diethylene glycol, propylene glycol, and dipropylene glycol esters of a fatty acid of linseed oil.

6. The film-forming composition of claim 1 wherein the coalescent aid comprises the methyl ester of a fatty acid of corn oil, sunflower oil, soybean oil, or linseed oil.

7. The film-forming composition of claim 1 wherein the weight of the ester is about 1% to about 4% of the weight of the liquid prepolymer.

8. The film-forming composition of claim 1 wherein the ester is an ethylene glycol monoester derived from a fatty acid of soybean oil.

9. The film-forming composition of claim 1 wherein the ester is an ethylene glycol monoester of a fatty acid derived from sunflower oil.

10. The film-forming composition of claim 1 wherein the ester is a diethylene glycol monoester of a fatty acid derived from soybean oil.

11. The film-forming composition of claim 1 wherein the ester is a diethylene glycol monoester of a fatty acid derived from sunflower oil.

12. The film-forming composition of claim 1 wherein the ester is a methyl ester of a fatty acid derived from soybean oil.

13. The film-forming composition of claim 1 wherein the ester is a methyl ester of a fatty acid derived from sunflower oil.

14. The film-forming composition of claim 1 wherein the ester is an ethylene glycol monoester of a fatty acid derived from corn oil.

15. The film-forming composition of claim 1 wherein the ester is an ethylene glycol monoester of a fatty acid derived from linseed oil.

16. The film-forming composition of claim 1 wherein the continuous aqueous phase constitutes at least about 20 wt. % of the film-forming composition.

17. The film-forming composition of claim 1 wherein the dispersed or continuous aqueous phase further comprises an additive selected from the group consisting of wetting aids, dispersants, thickeners, defoaming agents, biocides, algicides, ultra-violet inhibitors, flow agents, levelling agents, rheology modifiers, freeze thaw stabilizing agents, pH modifiers, flash rust inhibitors, and biocides.

18. The film-forming composition of claim 1 wherein the film-forming composition contains at least about 20 wt. % water, and at least about 10 wt. % liquid pre-polymer.

19. The film-forming composition of claim 1 wherein the continuous aqueous phase contains less than about 10 wt. % organic solvent.

* * * * *